US012755051B2

(12) United States Patent
Norcross et al.

(10) Patent No.: US 12,755,051 B2
(45) **Date of Patent: *Oct. 6, 2026**

(54) AGGREGATING PERMISSIONS ACROSS MULTIPLE PLATFORMS

(71) Applicant: Capital One Services, LLC, McLean, VA (US)

(72) Inventors: Brad Norcross, Richardson, TX (US); Sandeep K. Vanka, Plano, TX (US); Mitchell Mays, Little Elm, TX (US); Roshni Rao, Frisco, TX (US); Susan Hannagan, Dallas, TX (US); Tahressa Moore, Lucas, TX (US); Bryan Parker, Richardson, TX (US); Camille Gaelle Gupta, Frisco, TX (US); Arielle Mcmahon, Plano, TX (US); Rebecca Hummel, Richardson, TX (US); Jiaxin Guo, Chicago, IL (US); Mia Frederick, The Colony, TX (US); Alexis Pritchard, Dallas, TX (US); Srikanth Vadlapati, Louisville, KY (US)

(73) Assignee: Capital One Services, LLC, McLean, VA (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/973,754

(22) Filed: Dec. 9, 2024

(65) Prior Publication Data

US 2025/0103747 A1 Mar. 27, 2025

Related U.S. Application Data

(63) Continuation of application No. 17/661,823, filed on May 3, 2022, now Pat. No. 12,169,583, and a
(Continued)

(51) Int. Cl.
*G06F 21/62* (2013.01)
*G06F 21/32* (2013.01)
*G06F 21/60* (2013.01)

(52) U.S. Cl.
CPC .......... *G06F 21/6245* (2013.01); *G06F 21/32* (2013.01); *G06F 21/602* (2013.01); *G06F 21/6209* (2013.01)

(58) Field of Classification Search
CPC .... G06F 21/6245; G06F 21/32; G06F 21/602; G06F 21/6209
See application file for complete search history.

(56) References Cited

U.S. PATENT DOCUMENTS 7,478,434 B1 1/2009 Hinton et al.
8,392,294 B2 3/2013 Mac Innis
(Continued)

FOREIGN PATENT DOCUMENTS

CN 107092830 A 8/2017
WO 2014140685 A1 9/2014
(Continued)

*Primary Examiner* — Jung W Kim
*Assistant Examiner* — James P Moles
(74) *Attorney, Agent, or Firm* — Banner & Witcoff, Ltd.

(57) ABSTRACT

A system, process, and computer-readable medium for securely transferring user personal identification information (PII) across platforms, based on specific permissions, are described. One or more aspects provide greater control, to a user, of when that user's PII may be released from a secure storage in a first platform and securely provided to a second platform. The timing of those releases of the PII may be controlled by specific authorizations from the user via one or more processes. Also, in addition to improving the security associated with the PII transferred between platforms, one or more aspects improve users' experiences by permitting controlled reuse of users' PII to simplify how
(Continued)

users provide their PII to separate processes being performed on separate platforms.

20 Claims, 21 Drawing Sheets

Related U.S. Application Data continuation of application No. 17/661,839, filed on May 3, 2022, now Pat. No. 12,192,187.

(56) References Cited

U.S. PATENT DOCUMENTS

| | | | | |
|---|---|---|---|---|
| 8,548,902 | B2 | 10/2013 | Porter | |
| 8,655,719 | B1 | 2/2014 | Li et al. | |
| 8,688,594 | B2 | 4/2014 | Thomas et al. | |
| 8,924,523 | B1 | 12/2014 | Dickie | |
| 8,977,853 | B2 | 3/2015 | Bassu et al. | |
| 9,344,424 | B2 * | 5/2016 | Tenenboym | G06Q 20/38215 |
| 10,237,278 | B1 * | 3/2019 | Saylor | G06F 21/45 |
| 11,481,511 | B2 * | 10/2022 | Amar | G06F 21/78 |
| 11,783,062 | B2 | 10/2023 | Lounsberry | |
| 11,831,776 | B2 | 11/2023 | Apsingekar et al. | |
| 2003/0047602 | A1 | 3/2003 | Iida et al. | |
| 2006/0282395 | A1 | 12/2006 | Leibowitz | |
| 2009/0198575 | A1 | 8/2009 | Kapila | |
| 2011/0161419 | A1 | 6/2011 | Chunilal | |
| 2012/0036360 | A1 * | 2/2012 | Bassu | H04L 9/3228 713/168 |
| 2012/0296804 | A1 | 11/2012 | Stibel et al. | |
| 2013/0103582 | A1 | 4/2013 | Singfield | |
| 2013/0139229 | A1 | 5/2013 | Fried et al. | |
| 2014/0164255 | A1 | 6/2014 | Daly et al. | |
| 2015/0127628 | A1 | 5/2015 | Rathod | |
| 2015/0163061 | A1 | 6/2015 | Gupta | |
| 2016/0098577 | A1 * | 4/2016 | Lacey | G06F 21/6245 726/28 |
| 2016/0255089 | A1 | 9/2016 | Diestler et al. | |
| 2016/0267295 | A1 | 9/2016 | Gervais et al. | |
| 2016/0342811 | A1 | 11/2016 | Whitcomb et al. | |
| 2017/0006024 | A1 | 1/2017 | Pedersen et al. | |
| 2017/0091464 | A1 * | 3/2017 | Richards | H04L 63/102 |
| 2017/0140174 | A1 * | 5/2017 | Lacey | G06Q 20/4016 |
| 2018/0040064 | A1 | 2/2018 | Grigg et al. | |
| 2018/0046753 | A1 | 2/2018 | Shelton | |
| 2018/0089461 | A1 | 3/2018 | Williams et al. | |
| 2018/0218168 | A1 * | 8/2018 | Goel | G06F 21/6245 |
| 2018/0234241 | A1 * | 8/2018 | Weimer | H04L 9/3239 |
| 2019/0377900 | A1 | 12/2019 | Balzer et al. | |
| 2020/0019715 | A1 * | 1/2020 | Malliah | G06F 21/64 |
| 2020/0106611 | A1 * | 4/2020 | Bharatam | H04L 9/088 |
| 2021/0042724 | A1 | 2/2021 | Rathod | |
| 2021/0192519 | A1 * | 6/2021 | Mchugh | G06Q 20/3221 |
| 2021/0390196 | A1 | 12/2021 | Lavine et al. | |
| 2022/0121828 | A1 * | 4/2022 | Hart | H04L 63/0428 |
| 2022/0207534 | A1 * | 6/2022 | Barkhurst | G06Q 20/4014 |
| 2022/0337595 | A1 * | 10/2022 | Malik | G06F 21/6218 |
| 2023/0093868 | A1 * | 3/2023 | Zaitsev | G06F 21/629 726/26 |
| 2023/0252460 | A1 | 8/2023 | Thalenjeri et al. | |

FOREIGN PATENT DOCUMENTS

| | | | |
|---|---|---|---|
| WO | 2014140694 | A1 | 9/2014 |
| WO | 2015036817 | A1 | 3/2015 |
| WO | 2015044706 | A1 | 4/2015 |

* cited by examiner

1101

| User ID (1102) | E_PII (1103) | User Credentials (1104) | Result ID (1105) | Third Party ID (1106) | Process 1 Result (1107) | Process 2 Result (1108) |
|---|---|---|---|---|---|---|
| A | | | Q | R | M | N |
| A | | | Q | S | M | N+P |
| B | | | | | | |
| B | | | | | | |
| C | | | | | | |
| ... | | | | | | |

FIG. 11

1200 task [object]
Attributes of Task taskType string
Indicates type of task for third party

Valid values: Check_Availability, Schedule_View, Contact_User, Request_Consent, Prefill_Second_Process_Request externalReference object
An external reference ID (external result identification)

referenceId string
The reference ID (e.g., resultID)

referenceType string
The type of reference ID. If the type is STRUCTURE_ID, then the referenceId will be the actual structure ID Valid values: StructureId

TaskStatus string
Indicates the task status

Valid values: Open, InProgress, Completed, Cancelled, Postponed, NotRequested

FIG. 12

AGGREGATING PERMISSIONS ACROSS MULTIPLE PLATFORMS

CROSS-REFERENCE TO RELATED APPLICATIONS

This application is a continuation of U.S. patent application Ser. No. 17/661,823, filed May 3, 2022. This application is also a continuation of U.S. patent application Ser. No. 17/661,839, filed on May 3, 2022. The disclosures of these applications are hereby incorporated by reference herein in their entirety and made part hereof.

FIELD OF USE

Aspects of the disclosure relate generally to exchanging information between networked devices.

BACKGROUND

Significant portions of modern life are connected to data. Individuals are constantly balancing between the security of keeping their data private and the ease of storing their data in an extensible form. Over time, users vacillate between extremes: opting for minimizing how many entities have access to their data (until they become weary of providing the same data to different entities for similar purposes); and opting for sharing their data between entities to reduce repetitive reentering data (until one of the entities experiences a data leak or uses one's data to perform unneeded or unwanted services to the user's detriment).

SUMMARY

The following presents a simplified summary of various aspects described herein. This summary is not an extensive overview and is not intended to identify key or critical elements or to delineate the scope of the claims. The following summary merely presents some concepts in a simplified form as an introductory prelude to the more detailed description provided below.

Aspects described herein may address these and other problems, and generally improve when and how a user's data is securely transferred across computing platforms. For explanatory purposes, the user's data is referred to as personal identifiable information (PII) associated with the user. One or more aspects provide greater control, to a user, of when that user's PII may be released from a secure storage in a first platform and securely provided to a second platform. The timing of those releases of the PII may be controlled by specific authorizations from the user via one or more processes. Also, in addition to improving the security associated with the PII transferred between platforms, one or more aspects improve users' experiences by permitting controlled reuse of users' PII to simplify how users provide their PII to separate processes being performed on separate platforms. In addition, by securely storing the users' PII separately from processes that exchange the data across platforms, enhanced protection of the users' PII is provided while decreasing processing burdens on the individual platforms. Further improvements include reducing errors caused by incorrect data entry (e.g., by users and/or by others associated with obtaining the users' PII for the performance of other processes) and, thus, improving the overall experiences of the individual users as well as each platform's separate clients.

According to some aspects, a computer-implemented method may comprise receiving, by a computing device and from a user device, personal identifiable information (PII) of a user; receiving, by the computing device, a first authorization for a first permission; encrypting the PII responsive to the first authorization; and storing the encrypted PII associated with a first identifier (e.g., a user identifier). The method may further include enabling, by the computing device and for one or more third-party computing systems, access to a result (e.g., a result from the execution of a process) based on at least part of the PII and consistent with the first permission. The result may be associated with a second identifier. The method may further include receiving a request for a second permission of the user from a first third-party computing system of the one or more third-party computing systems. The first third-party computing system may be associated with a third identifier. The method may further include sending, to the user device, an encoded link as part of a request for a second authorization for the second permission. The encoded link may include the first identifier, the second identifier, and the third identifier. The method may further include receiving, from the user device and via access to the encoded link, a response to the request for the second authorization. The response may include the second authorization, the first identifier, the second identifier, and the third identifier. The method may further include accessing, by the computing device and based on receiving the second authorization, the encrypted PII; decrypting the encrypted PII; and enabling, by the computing device and for a second third-party computing system, access to at least part of the decrypted PII to initiate a process consistent with the second permission. In some aspects, the access may be via a secure channel. The method may further include accessing the encrypted PII may be further based on the first identifier, the second identifier, and the third identifier. The method may further include accessing, by the computing device, a second result from the process and enabling access, by a third third-party computing system, to the second result. The method may further include accessing, by the computing device, a second result from the process; encrypting the second result; and storing, associated with the first identifier and the second identifier, the encrypted second result.

In some aspects, the computer-implemented method may further include enabling access to the first identifier, the second identifier, and the third identifier. In some aspects, the method may further include receiving user authentication information and authenticating, by the computing device and based on the received user authentication information, the user device. In some aspects, the method may further include enabling, by the computing device and for the one or more third-party computing systems, access to an immutable document comprising the first authorization for the first permission. In some aspects, the method may further include enabling, by the computing device and for the first third-party computing system, access to an immutable document comprising the second authorization for the second permission.

A system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. As such, corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 11 depicts a sample dataset comprising encrypted PII of users and merchants that are related to the users based on common events;

FIG. 12 depicts a sample task object exchanged and updated during interactions across the platforms;

DETAILED DESCRIPTION

Figure 1:
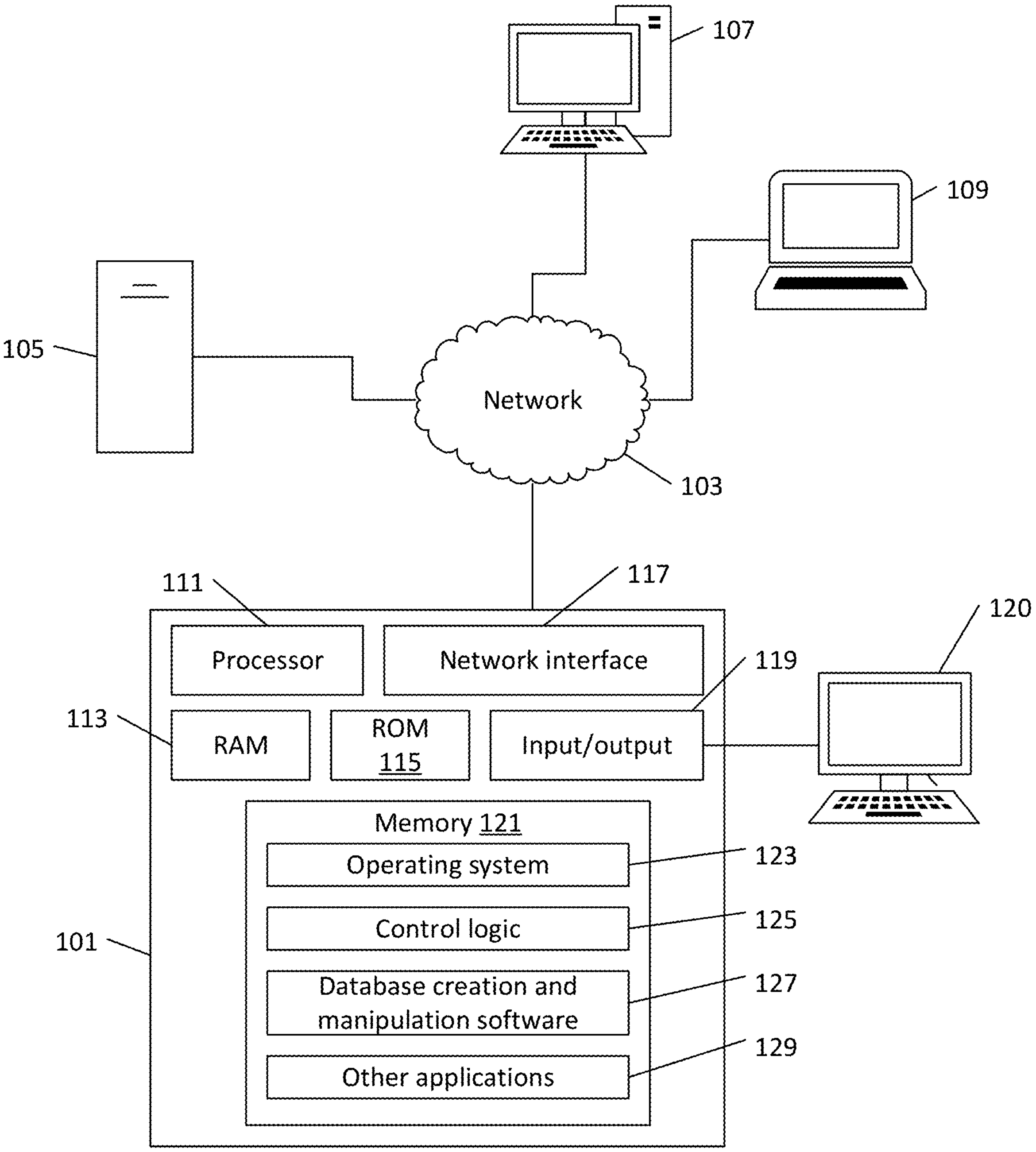
FIG. 1 depicts an example of a computing device and system architecture that may be used in implementing one or more aspects of the disclosure in accordance with one or more illustrative aspects discussed herein.

In the following description of the various embodiments, reference is made to the accompanying drawings, which form a part hereof, and which are shown by way of illustration of various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. Any sequence of computer-implementable instructions described in this disclosure may be considered to be an "algorithm" as those instructions are intended to solve one or more classes of problems or to perform one or more computations. While various directional arrows are shown in the figures of this disclosure, the directional arrows are not intended to be limiting to the extent that bi-directional communications are excluded. Rather, the directional arrows are to show a general flow of steps and not the unidirectional movement of information. In the entire specification, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by a combination of hardware and software. In addition, terms such as " . . . unit", " . . . module" described in the specification mean a unit for performing at least one function or operation, which may be implemented as hardware or software, or as a combination of hardware and software. Throughout the specification, the expression "at least one of a, b, and c" may include 'a only', 'b only', 'c only', 'a and b', 'a and c', 'b and c', and/or 'all of a, b, and c'. The expression "at least one of a, b, or c" may include 'a only', 'b only', 'c only', 'a and b', 'a and c', 'b and c', and/or 'all of a, b, and c'. Similarly, the expression "one or more of a, b, and c" may include 'a only', 'b only', 'c only', 'a and b', 'a and c', 'b and c', and/or 'all of a, b, and c'. The expression "one or more of a, b, or c" may include 'a only', 'b only', 'c only', 'a and b', 'a and c', 'b and c', and/or 'all of a, b, and c'.

By way of introduction, aspects discussed herein may relate to methods and techniques for improving the security of users' PII while also improving how the users' PII is used by different platforms based on specific user permissions. An issue that exists for all users is the competing concerns of keeping their data private while also seeking to streamline processes and/or events using their existing data. Too often, users seek services that, while providing strong protection of the users' PII, also prevent the extensibility of the users' PII to be used by the users as needed. Because of this, users are often required to reenter the same basic data repeatedly every time users request a new process to be performed based on the identity of the user. Even forcing users to copy and paste their existing PII into a new user interface for the performance of a new process related to a recently performed process can be tedious and error-prone. One or more aspects of the disclosure simplify the process for users by requesting permissions for the users' PII to be transferred to a new platform for performing a new process, thereby reducing the quantity of operations to be performed by the users while also simplifying the operations for gathering the users' PII for the new process.

In one or more example use cases, users may provide their PII to a first platform and, based on permissions provided to that platform, the platform may selectively provide one or more portions of the users' PII to other platforms. Those other platforms may perform one or more processes specific to those platforms based on the received portions of the users' PII. In some aspects, the exchange of information may be facilitated through the use of a predefined process that manages obtaining user permissions as well as the exchange of the users' PII. In some aspects, a secure storage may be used that contains one or more data structures that relate the users' PII with specific permissions and/or events to facilitate enhanced security of the users' PII. For instance, instead of providing the users' PII available to any process that requests it, systems described herein regulate which platforms may be able to obtain the users' PII based on the previously provided permissions and/or event identifications resident in the data structure.

In one or more examples, a user may provide its PII to a secure data storage. That PII may be stored with the user's identification. When receiving the PII and/or at a different time, the user may provide one or more permissions to a service. The service may then forward the PII, based on the user's permissions, to one or more additional platforms. Those additional platforms may then use the PII to the extent of the provided permission. If additional processes are to be performed, those additional platforms may then contact, via the service, the user to obtain additional permissions for the performance of those additional processes. The user may then provide those additional permissions to the service and, by interacting with the secure storage, the service may obtain and forward the additional PII to the additional platforms, where the additional processes may be performed. In one or more examples, the results of those additional processes may then be forwarded back through the service to the secure data storage, and those results stored in association with the users (e.g., associating the user's identification, the user's PII, the status of the user's permissions (granted and/or denied), identifications of the results of processes, various third party IDs, and/or the results of processes performed in associated with the granted permissions).

Some advantages described herein include improving the timeliness of information exchanged between platforms. Other advantages include reducing the friction encountered by users attempting to reuse their previously stored PII in a secure manner. Further advantages may include pre-populating datasets required for yet further processes to be performed for the users based on previously granted permissions for pre-populating those data sets. These advantages may be realized, for example, in the auto loan process, which may include coordinating a user's PII amongst at least four parties. In this regard, a buyer may provide PII to a financial institution (e.g., a bank) to be pre-qualified for a loan. The financial institution may share pre-qualification information, which may contact the buyer. Once the buyer has selected a vehicle to purchase, a dealership may contact the financial institution to begin the loan application process. The financial institution may contact the buyer for authorization to begin the loan application process. In response to receiving the buyer's authorization, the financial institution may send the buyer's PII to a financial platform, such as DealerTrack or RouteOne, to obtain one or more options for an auto loan. Upon receiving the buyer's PII from the financial institution, the financial platform and/or the dealership may coordinate to finalize the loan application and compete the purchase of the vehicle.

As described herein, the service and the third-party service may be separate from each other. Alternatively or additionally, the service and the third-party service may be combined into a single service.

Before discussing these concepts in greater detail, however, several examples of a computing device that may be used in implementing and/or otherwise providing various aspects of the disclosure will first be discussed with respect to FIG. 1. FIG. 1 illustrates one example of a computing device 101 that may be used to implement one or more illustrative aspects discussed herein. For example, the computing device 101 may, in some embodiments, implement one or more aspects of the disclosure by reading and/or executing instructions and performing one or more actions based on the instructions. In some embodiments, the computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The computing device 101 may, in some embodiments, operate in a standalone environment. In others, the computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109, and other devices (not shown) may be connected to one or more of the networks via twisted pair wires, coaxial cables, fiber optics, radio waves, or other communication media. Additionally or alternatively, the computing device 101 and/or the network nodes 105, 107, and 109 may be a server hosting one or more databases.

As seen in FIG. 1, the computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. Input/output interfaces 119 may include a variety of interface units and drives for reading, writing, displaying, and/or printing data or files. Input/output interfaces 119 may be coupled with a display such as display 120. Memory 121 may store software for configuring computing device 101 into a special-purpose computing device in order to perform one or more of the various functions discussed herein. Memory 121 may store operating system software 123 for controlling the overall operation of the computing device 101, control logic 125 for instructing the computing device 101 to perform aspects discussed herein, database creation and manipulation software 127, and other applications 129. Control logic 125 may be incorporated in and may be part of database creation and manipulation software 127. In other embodiments, the computing device 101 may include two or more of any and/or all of these components (e.g., two or more processors, two or more memories, etc.) and/or other components and/or subsystems not illustrated here.

Devices 105, 107, and 109 may have similar or different architecture as described with respect to the computing device 101. Those of skill in the art will appreciate that the functionality of the computing device 101 (or device 105, 107, 109) as described herein may be spread across multiple data processing devices, for example, to distribute processing load across multiple computers, to segregate transactions based on geographic location, user access level, quality of service (QOS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) Python or JavaScript. The computer-executable instructions may be stored on a computer-readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer-executable instructions and computer-usable data described herein. Various aspects discussed herein may be embodied as a method, a computing device, a data processing system, or a computer program product. Having discussed several examples of computing devices that may be used to implement some aspects as discussed further below, the discussion will now turn to a method for streamlining how permissions may be obtained for reusing data across different platforms.

Figure 2:
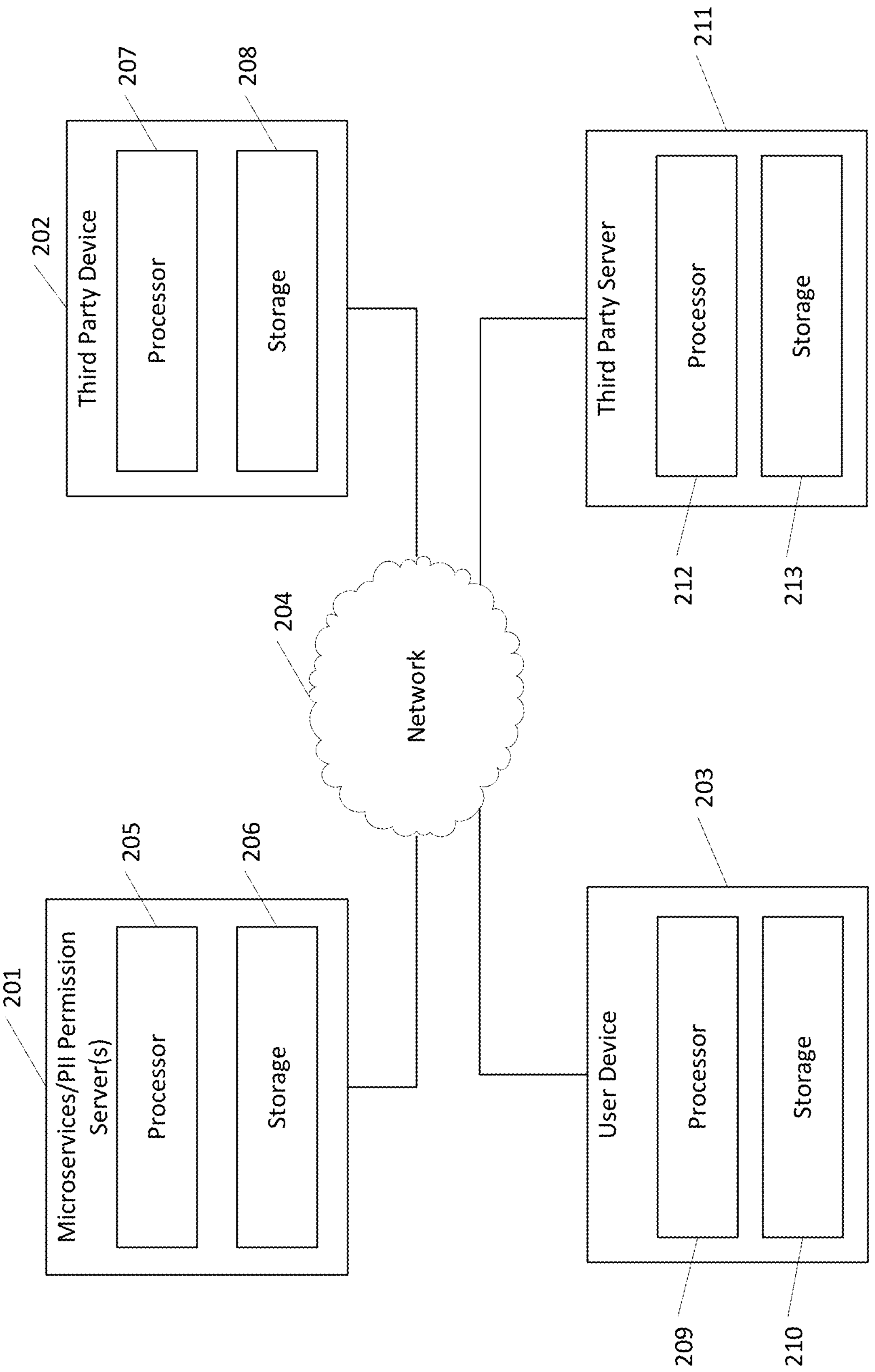
FIG. 2 depicts a block diagram of an environment in which systems and/or methods described herein may be implemented.

FIG. 2 is a block diagram of an environment in which systems and/or methods described herein may be implemented. As shown in FIG. 2, the environment may include a microservices and/or prefill server 201, a third-party device 202, a user device 203, and a third-party server 211, connected by a network 204. The devices, servers, and network may be interconnected via wired connections, wireless connections, or a combination of wired and wireless connections. The microservices and/or prefill server 201 may be directed toward receiving a user's PII and user authorizations from the user device 203, receiving requests, from the third-party device 202, to obtain new authorizations for the stored PII to be used in new processes, and to provide, based on authorizations from the user, the PII to the third party server 211 for completion of new processes. Microservices are an architectural and organizational approach to software development where software is composed of small independent services that communicate over well-defined APIs. The microservices as described herein may be configured to handle small client-server transactions through various APIs.

The network 204 may include one or more wired and/or wireless networks. For example, network 204 may include a cellular network (e.g., a long-term evolution (LTE) network, a code division multiple access (CDMA) network, a 3G network, a 4G network, a 5G network, another type of next-generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more servers shown in FIG. 2 may be implemented within a single server, or a single server shown in FIG. 2 may be implemented as multiple, distributed servers or in a cloud-based computing environment. Additionally, or alternatively, a set of devices (e.g., one or more devices) of the user device 203 and/or third-party device 202 may perform one or more functions described as being performed by another set of devices of the environment. Network 204 may be represented as a single network but may comprise combinations of other networks or subnetworks. In one or more examples, a data stream (not shown) may be received by the microservices and/or prefill server 201, where the microservices and/or prefill server 201 is a data store for received information.

Processes for receiving user information and sending, upon authorization from the user, the user information to separate systems is described herein. For purposes of explanation, the processes are described in the following sections: Process-based Storing and Forwarding of User Information; Process Interactions; Processes for Handling Original and New User Information; Data Structures; Graphical Interfaces; User Authorizations; and Permission-handling/Prefill Server-based Processes.

Process-Based Storing and Forwarding of User Information

Figure 3:
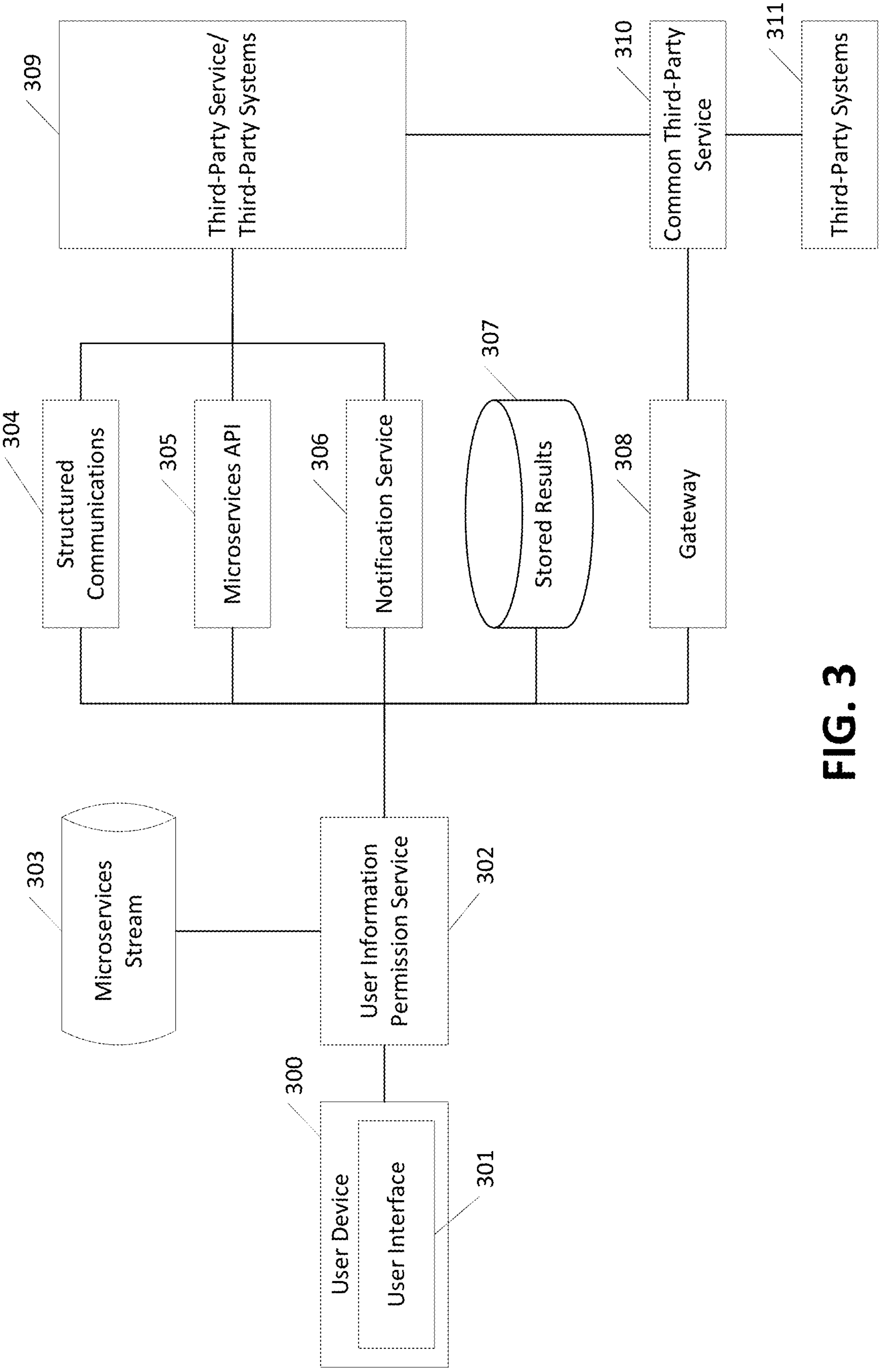
FIG. 3 depicts a block diagram showing various components and pathways for exchanging user information between platforms.

FIG. 3 depicts a block diagram showing various components and pathways for exchanging user information between platforms. FIG. 3 shows a user device 300 with a user interface 301 configured to receive a user's personal identification information (PII) via the user interface 301. The user device 300 may then send the PII to a user information permission service 302. The user information permission service 302 securely stores the PII. The user information permission service 302 may also monitor a microservices stream 303 for information and/or events related to requests for the user's PII. FIG. 3 also shows the user information permission service 302 connected to a variety of data sets and information stores. The user information permission service 302 interacts with a third-party service and/or third-party systems 309 by sending and receiving structured communications 304. The structured communications 304 may be exchanged directly with the third-party service and/or third-party systems 309 via an application programming interface 305. Additionally or alternatively, a notification service may be provided that alerts the user information permission service 302 and/or the third-party service and/or third-party system 309 of new events relating to new requests for information, new permissions provided by various users, and other new items of interest. The structured communications 304 may comprise one or more data structures with predefined fields for population with information from users, third-party devices, and/or yet other third-party systems.

For example, the third-party service/third-party systems 309 may communicate with a common third-party service 310 that interacts with one or more third-party systems 311. The user information permission service 302 may also interact with the common third-party service 310 via gateway 308. As a third party of the third-party service/third-party systems 309 interacts with a user, the third-party service and/or third-party system 309 may request, via microservices API 305, permissions to use one or more portions of the user's PII for services to be performed by the third-party systems 311. The request for the permission may be sent, via the microservices API 305, to the user information permission service 302 then interacts with the user device 300 to obtain the user's permissions, e.g., via a user interface 301. The grant or denial of those permissions is then provided by the user device 300 to the user information permission service 302 and an appropriate response is sent to the third-party service/third-party systems 309. In the event that the user provides one or more permissions, the relevant PII may then be made available to the common third-party service 310 via the gateway 308. In some examples, the information may be sent directly to the gateway 308 and then forwarded to the common third-party service 310. In other examples, the information may be made available to the common third-party service 310 which may use gateway 308 to retrieve the information presented by the user information permission service 302. In yet further examples, a staging area may be provided as part of the gateway 308 where the common third-party service 310 retrieves the PII from the staging area. The PII may then be provided to third-party systems 311 for the performance of one or more processes related to the user permissions. The results from the performance of those processes may be returned to the common third-party service 310 and then forwarded to other entities of FIG. 3.

In one or more examples, the gateway 308 may comprise one or more mapping tables that relate the stored fields of the PII in the user information permission service 302 to the desired fields expected by the common third-party service 310. Additionally or alternatively, the mapping may occur in any of the user information permission service 302, the common third-party service 310, and/or the third-party systems 311.

In one or more examples, the results of the new process may be provided to the third-party service/third-party systems 309 and/or to the user information permission service 302, via gateway 308. FIG. 3 also shows a storage 307 configured to store data structures related to the results of one or more processes performed on the user's PII based on the user's previously granted permissions. The storage 307 may also store encrypted versions of the user's PII to be decrypted as needed by the user information permission service 302. In one or more examples, the user information permission service 302 may further comprise monitoring states of permissions from the user.

Figure 4:
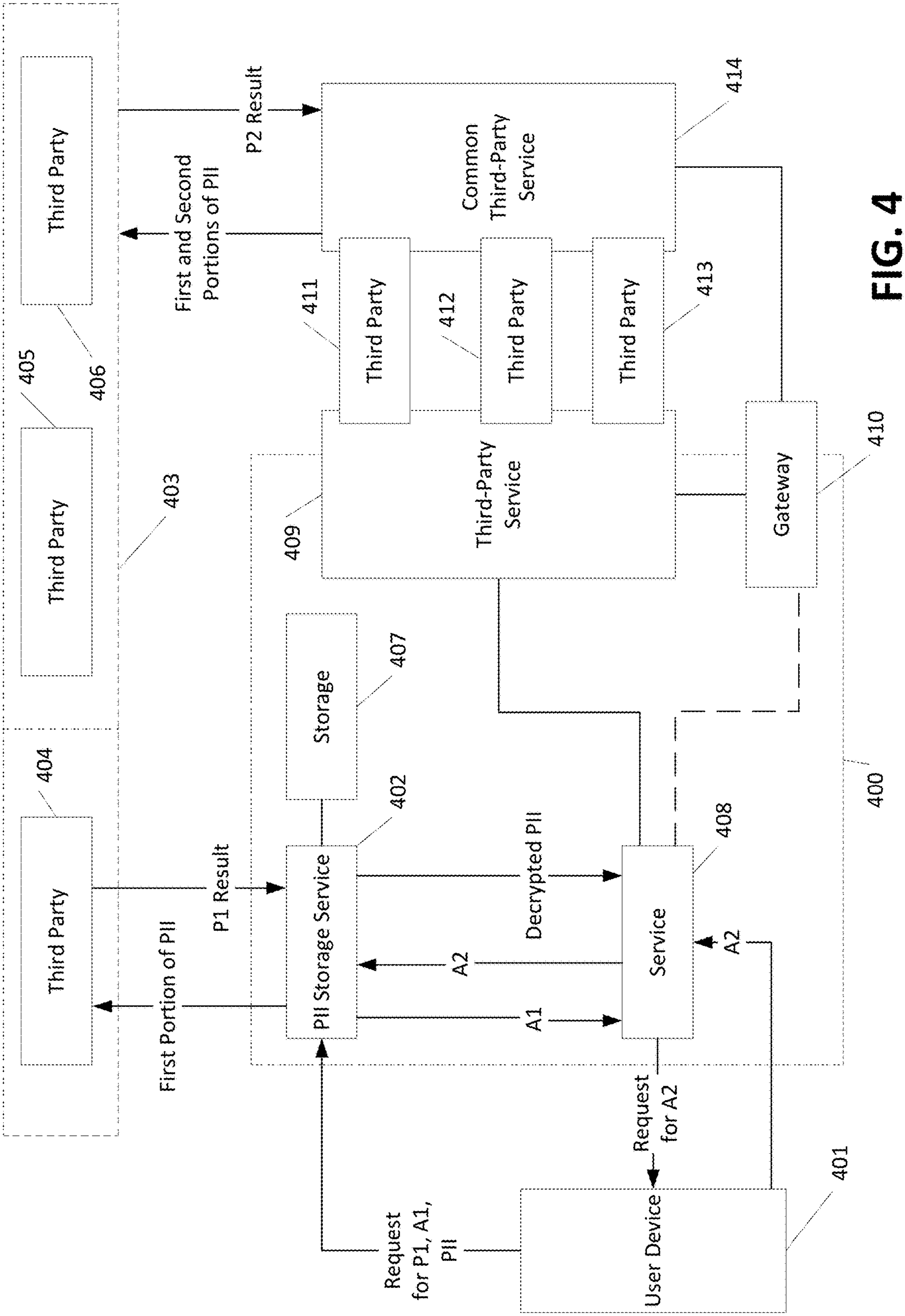
FIG. 4 depicts a block diagram of services and the interactions of those services.

FIG. 4 depicts a block diagram of services and the interactions of those services. FIG. 4 shows a user information permission service 400 interacting with a user device 401, one or more third parties 403 via a first pathway, and one or more third parties 411-413 via a second pathway. The user information permission service 400 may also interact with a common third-party service 414 via a third pathway. The common third-party service 414 may also interact with one or more of the third parties 403 and one or more of the third parties 411-413.

For example, a user device 401 may receive customer input that includes a request for a first process P1 to be performed, a first authorization A1 for that first process, and the user's PII. The request for the first process P1, the first authorization A1, and the PII are sent to a PII storage service 402 managed by the user information permission service 400. The PII storage service 402 stores the PII and permissions from the user in storage 407 in an encrypted form.

The PII storage service 402 also provides a first portion of the PII to a third party 404 of third parties 403 for the performance of the first process. A result of the first process is forwarded from the third party 404 to the PII storage service 402, where the result may be stored in the storage 407. FIG. 4 shows the forwarding of the permission and PII to the third party 404 using a direct pathway between PII storage service 402 and the third party 404. Alternatively or additionally, the permission and PII may be forwarded via the service 408.

As described herein, the service 408 may be separate from a third-party service 409. Alternatively or additionally, the service 408 and the third-party service 409 may be combined into a single service.

Based on the first authorization, the PII storage service 402 alerts the service 408 that the first permission has been received from the user device 401 and the result from the third party 404. The first authorization may be provided, via the third-party service 409, to one or more third parties 411-413. One or more of the third parties 411-413 may then request, via the third-party service 409, the service 408 to obtain a second authorization from the user. The service 408 may forward the request for the second authorization to the user device 401. The response from the user device 41 may be received by the service 408 and sent to the PII storage service 402. After authenticating the second authorization, the PII storage service 402 decrypts the decrypted PII and provides it to the service 408. The service 408 makes the decrypted PII available to the common third-party service 414 via the third-party service 409 and gateway 410 and/or directly via gateway 410 (as shown by the dashed line connecting service 408 and gateway 410). The PII provided to the common third-party service 414 may be provided in a secure channel and/or via other secure methods (including but not limited to public/private key encryption and other methods). The decrypted PII, available to the common third-party service 414, may comprise a second portion of the PII and/or a combination of both the first portion of the PII and the second portion as needed to perform the second process.

The PII as originally provided by the user may comprise all information needed to perform all possible third-party processes. Alternatively, the user may enter its PII as needed for new processes. As described in FIG. 4, the "first portion" and the "second portion" of the PII may include a first portion and second portion of PII entered at a first time by the user, the first portion entered at a first time and the second portion entered at second time (e.g., before or after the first time related to the entry of the first portion of the PII), or combinations thereof.

The common third-party service 414 may forward the received PII (e.g., the first and second portions of the PII) to one or more third parties 404-406 of third parties 403 for the performance of the second process. The one or more third parties 404-406 may return the results of the second process to the common third-party service 414. The common third-party service 414 may provide the results of the second process to the third-party of third parties 411-413 that obtained the second authorization from the user device 401. Additionally or alternatively, the common third-party service 414 may provide the results of the second process to the service 408 via the gateway 410 and third-party service and/or directly via gateway 410 (as shown by the dashed line connecting service and gateway 410).

In one or more examples, two or more third-party services may be provided. In the example of FIG. 4 and other figures, one of the third-party services is provided as third-party service 409 by the user information permission service 400. Another third-party service may be provided separately from the user information permission service 400 and is shown as a common third-party service 414. It is appreciated that further common third-party services (not shown) may be provided and interact with user information permission service 400 via gateway 410 and/or additional gateways (not shown).

In one or more examples, the common third-party service 414 may be general to all industries. Alternatively, the common third-party service 414 may cater to a specific industry. For instance, the common third-party service 414 may be specific to various industries and processes related to those industries including, but not limited to, performing security clearances and background checks of new users applying for a new position, providing tokenized data for training one or more machine learning engines, providing search results based on criteria from users, providing credit checks and/or financing options for users about to make a purchase, recording and exchanging user medical records in compliance with various governmental regulations (e.g., the health insurance portability and accountability act (HIPPA)), and recording and exchanging user financial information in conformance with banking and lending regulations. In one or more examples, third parties 403 may perform one or more of these processes. As shown in FIG. 4, third party 404 is shown separated from third parties 405 and 406 via a dashed line to represent that not all third parties are contacted for every possible process. For instance, for the first process using the first portion of the PII, only third party 404 is used. For the second process using the first and second portions of the PII, only third parties 405 and 406 may be used. Alternatively or additionally, all third parties 403 may be used for either or both of the first process and the second process.

Process Interactions

FIGS. 5-9 depicts various process flows for handling user authorizations for exchanging data across platforms. As described herein, the service and the third-party service may be separate from each other. Alternatively or additionally, the service and the third-party service may be combined into a single service.

Figure 5:
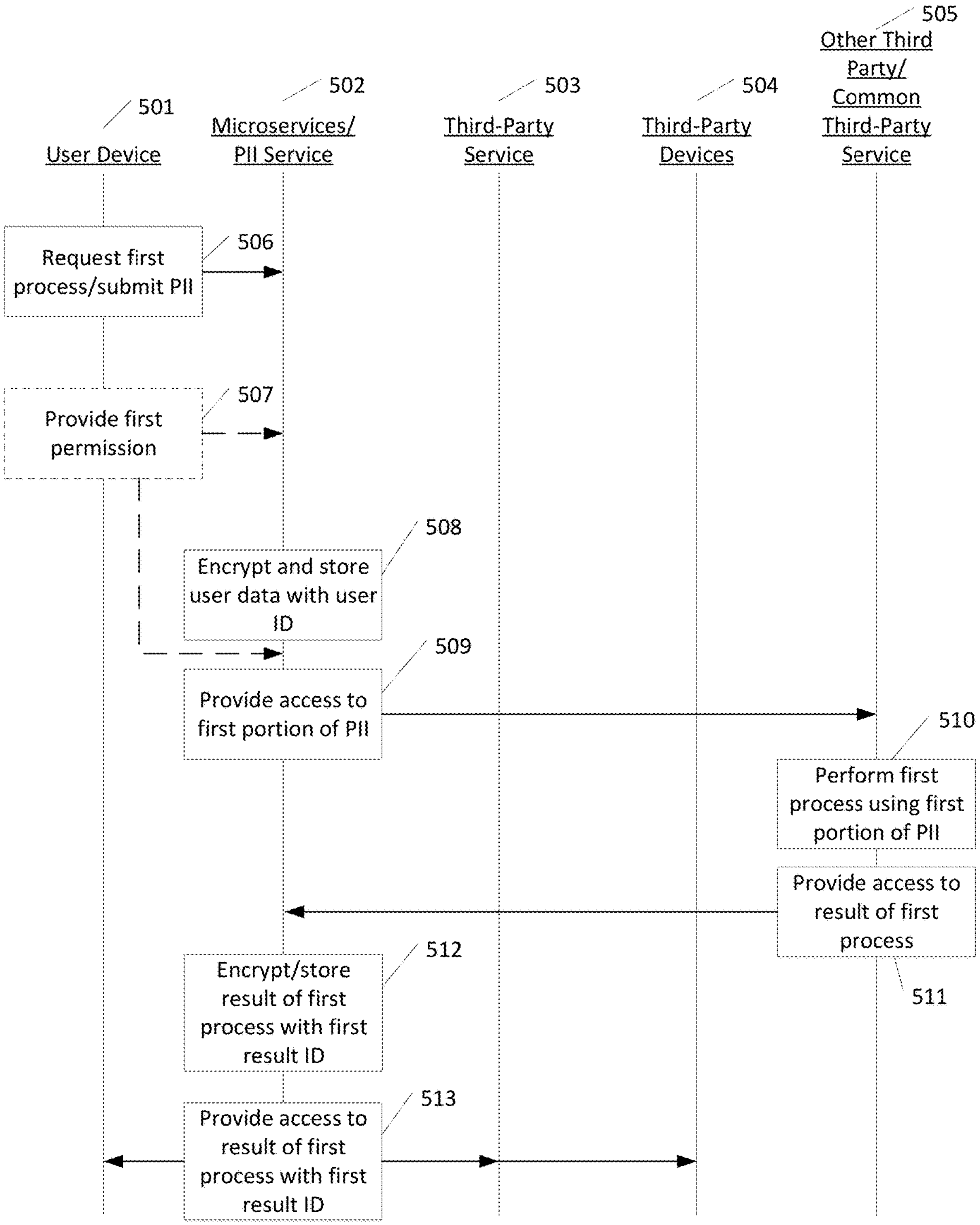
FIGS. 5-9 depict various process flows for handling user authorizations for exchanging data across platforms.

For example, FIG. 5 shows interactions between a user device 501, a Microservices/PII service 502, a third-party service 503, third-party devices 504, and other third-party/common third-party service 505. In a first step 506, a user, via user device 501, requests a first process to be performed and submits the PII. The request is sent to the microservices/PII service 502. The request may include a multi-factor authentication to authenticate the user to the microservices/PII service 502. For example, after entering a username/password combination or biometric authentication, the user may receive an electronic communication (e.g., text message, email, push notification, etc.) requesting authorization by clicking a link (e.g., button) in the electronic communication. As noted throughout the disclosure, the electronic communication may comprise a user identifier and/or other identifier. Clicking the button may constitute permission and/or authorize the first process to be performed using the user's PII. Additionally or alternatively, the link may cause an application on the user device 501 to launch. Upon launching, the application may prompt the user to enter their credentials. The credentials may be standard login information, such as username and password, biometric authentication, one-time code, current location information (e.g., using a GPS signal), etc. Successfully logging into the application on the user device 601 may be considered the first permission. Alternatively, the application may present an interface to the user that requests confirmation of the first permission. The request may also include a first permission 507 or, as shown in broken lines in FIG. 5, the first permission 507 may be separately provided by the user device 501.

The microservices/PII service 502 may encrypt and store the PII with the user identification as shown in step 508. In step 509, the microservices/PII service 502 may provide access to the first portion of the PII to the other third-party/common third-party service 505. In step 510, the third-party/common third-party service 505 performs a first process using the first portion of the PII. In step 511, the results of the first process are provided to the microservices/PII service 502. In step 512, the microservices/PII service 502 encrypts and stores the result of the first process with a result ID. The result ID may be assigned by the microservices/PII service 502, assigned by the other third-party/common third-party service 505, or by yet another entity. In step 513, access to the result of the first process and the first result ID may be provided to one or more of the user device 501, the third-party service 503, and/or third-party devices 504. The access provided in step 513 may additionally provide an indication that the first permission has been received (e.g. via a first authorization step) and/or provide an immutable copy of the permissions provided by the user having interacted with user device 501.

Figure 6:
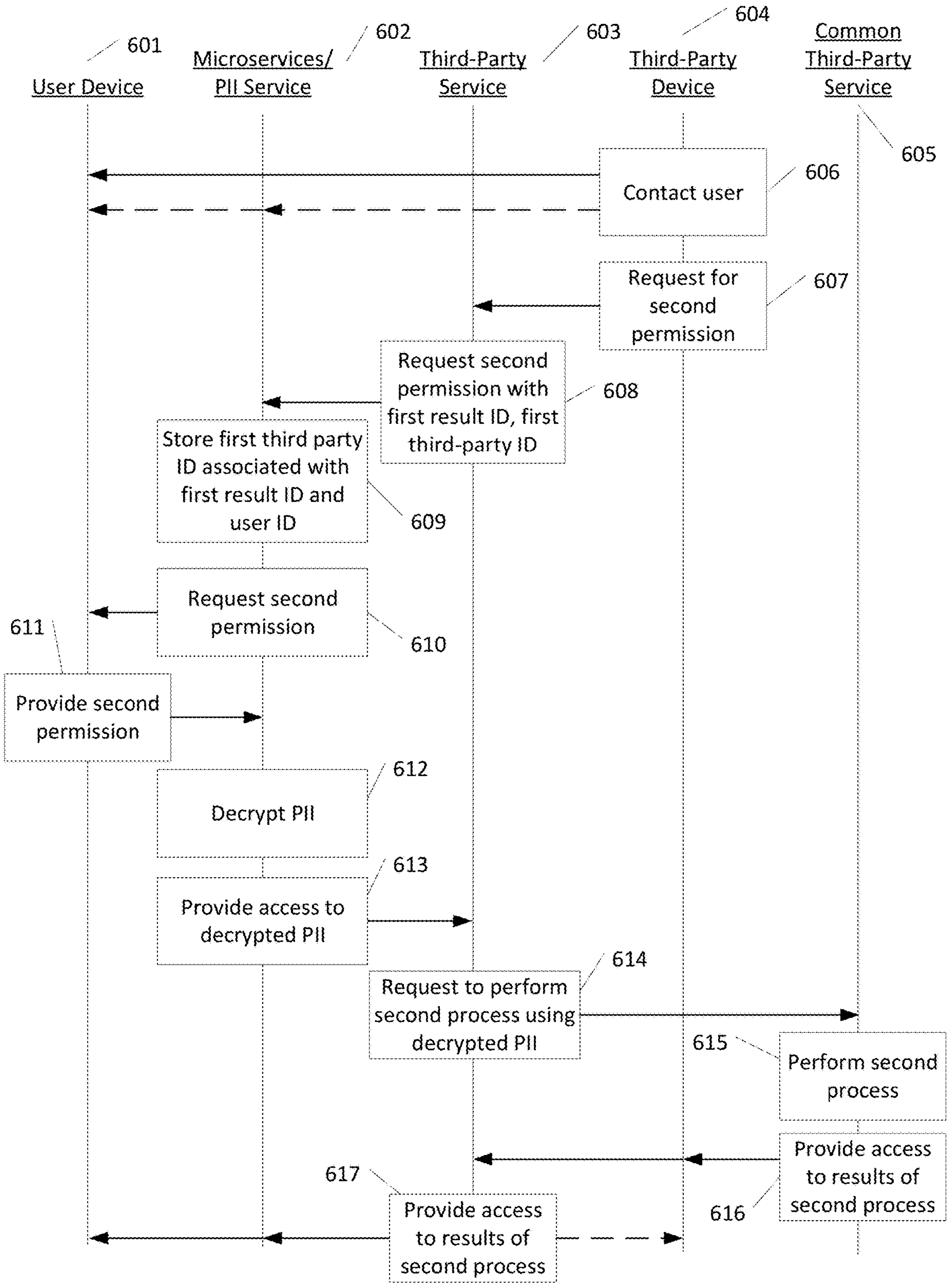

FIG. 6 shows additional interactions following the interactions of FIG. 5. FIG. 6 shows a user device 601, a microservices/PII service 602, a third-party service 603, a third party device 604, and a common third-party service 605. Based on having received contact information regarding the user as shown in FIG. 5, the third-party device 604 contacts the user (e.g., contacting the user directly via the user's device or other preferred method identified by the user device 601) or contacts the user by sending a request to the microservices/PII service 602, which is then forwarded to the user device 601.

After various interactions between the user and the owner of the third-party device 604, the user may agree to have one or more second processes performed on the user's PII. In one example the user may instruct the user device to perform the second processes directly using the process of FIG. 5. Additionally or alternatively, as shown in FIG. 6, the third-party device 604 may initiate the request for the second permission to perform the second process. In the example of FIG. 6, the third-party device 604 sends a request in step 607 to the third-party service 603 to obtain the second permission. The third-party service 603 identifies a third-party identification (third-party ID) associated with the third-party device 604, adds the first result ID (previously sent in step 513), and forwards a request for the second permission, in step 608, to the microservices/PII service 602. In step 609, the microservices/PII service 602 stores the first third-party ID associated with the first result ID and the user ID. Next in step 610, the microservices/PII service 602 requests a second permission, in step 610, from the user. Having the identification of the third party may be helpful to inform the user that the purpose of granting permissions is for a particular process and not for performing all future processes based on the PII.

In step 611, the user, via user device 601, provides a communication including the second permission to the microservices/PII service 602. The communication may include a multi-factor authentication to authenticate the user to the microservices/PII service 602. For example, the user may receive an electronic communication (e.g., text message, email, push notification, etc.) requesting authorization by clicking a link (e.g., button) in the electronic communication. As noted throughout the disclosure, the electronic communication may comprise at least one of a user identifier, a result identifier, or a third-party identifier. Clicking the button may constitute permission and/or authorize the second process to be performed using the user's PII. Additionally or alternatively, the link may cause an application on the user device 601 to launch. Upon launching, the application may prompt the user to enter their credentials. The credentials may be standard login information, such as username and password, biometric authentication, one-time code, current location information (e.g., using a GPS signal), etc. Successfully logging into the application on the user device 601 may be considered second permission. Alternatively, the application may present an interface to the user that requests confirmation of the second permission. Based on authenticating the user and/or the user device 601, the microservices/PII service 602 decrypts the PII in step 612 and, in step 613, provides access to the decrypted PII to the third-party service 603. In step 614, the third-party service 603 provides the request to perform the second process using the decrypted PII to the common third-party service 605 (e.g., via a secure channel or other secure method). In step 615, the common third-party service 605 performs the second process. In step 616, the common third-party service 605 provides access to the results of the second process to one or more of the third-party device 604 and/or the third-party service 603. In step 617, the third-party service 603 provides the results of the second process to the microservices/PII service 602 and/or the user device 601. If the results of the second process were not previously received directly from the common third-party service in step 616, the third-party service 603 may forward the results to the third-party device 604.

Figure 7:
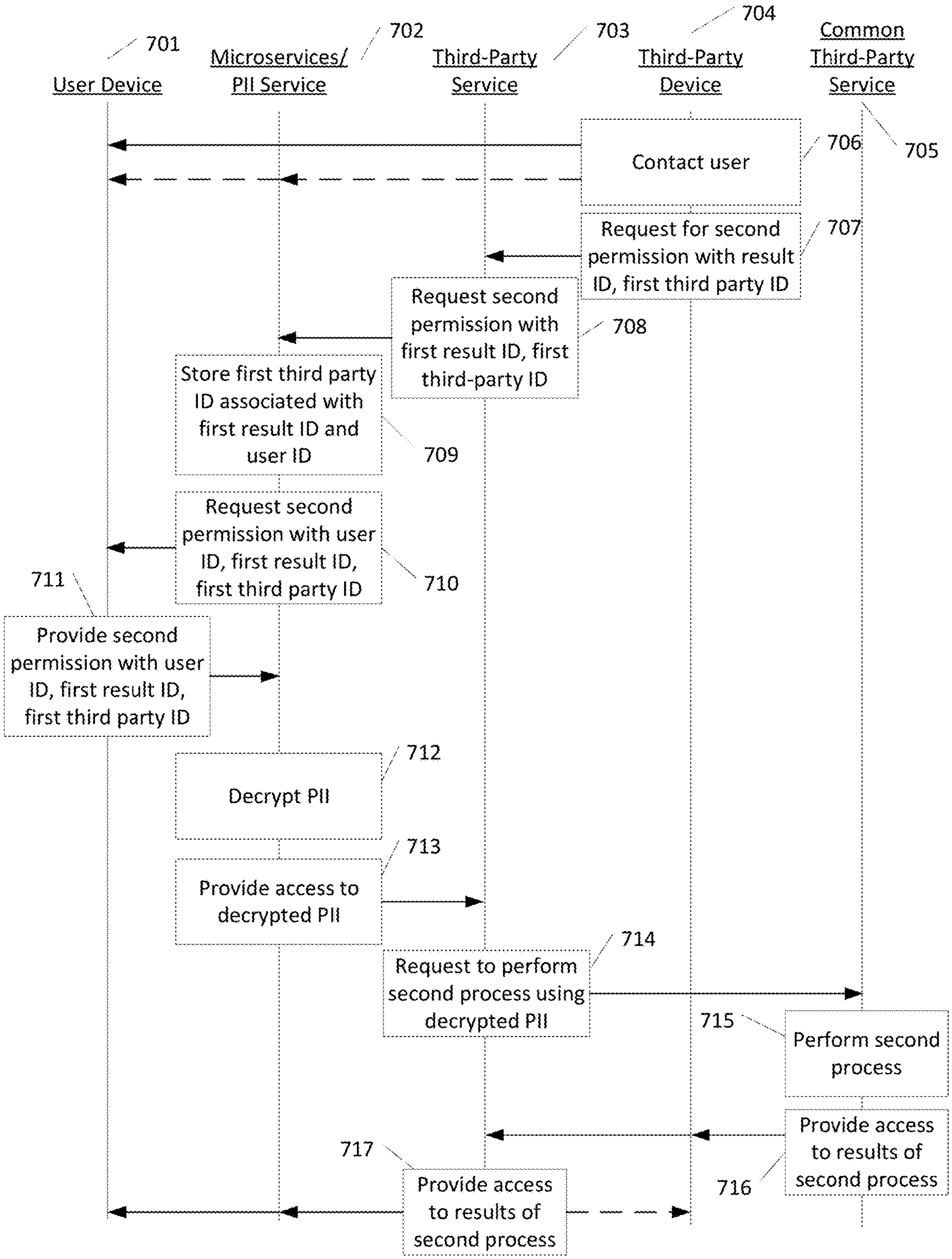

FIG. 7 shows an alternative approach to contacting a user and receiving the second permission. FIG. 7 shows a user device 701, a microservices/PII service 702, a third-party service 703, a third-party device 704, and a common third-party service 705. Based on having received contact information regarding the user as shown in FIG. 5, the third-party device 704 contacts the user (e.g., contacting the user directly via the user's device or other preferred method identified by the user device 701) or contacts the user by sending a request to the microservices/PII service 702, which is then forwarded to the user device 701.

After various interactions between the user and the owner of the third-party device 704, the user may agree to have one or more second processes performed based on the user's PII. The third-party device 704 may initiate the request for the second permission to perform the second process. In the example of FIG. 7, the third-party device 704 sends a request in step 707 to the third-party service 703 to obtain the second permission and includes the request ID and the third-party ID. The third-party service 703 forwards a request for the second permission, in step 708, to the microservices/PII service 702 with the request ID and the third-party ID. In step 709, the microservices/PII service 702 stores the first third-party ID associated with the first result ID and the user ID. Next in step 710, the microservices/PII service 702 requests a second permission, in step 710, from the user and includes the request ID and the third party ID and prepopulated user authentication information (e.g., enabling a simple login to the microservices/PII service 702). Having the identification of the third party may be helpful to inform the user that the purpose of granting permissions is for a particular process and not for performing all future processes based on the PII.

In step 711, the user, via user device 701, provides the second permission to the microservices/PII service 702. The second permission may be obtained, for example, via a multi-factor authentication process. For example, the user may receive, in step 710, an electronic communication (e.g., text message, email, push notification, etc.) requesting authorization by clicking a link (e.g., button) in the electronic communication. As noted throughout the disclosure, the electronic communication may comprise at least one of a user identifier, a result identifier, or a third-party identifier. Clicking the button may constitute permission and/or authorize the second process to be performed using the user's PII. Additionally or alternatively, the link may cause an application on the user device 701 to launch. Upon launching, the application may prompt the user to enter their credentials. The credentials may be standard login information, such as username and password, biometric authentication, one-time code, current location information (e.g., using a GPS signal), etc. Successfully logging into the application on the user device 701 may be considered second permission.

Alternatively, the application may present an interface to the user that requests confirmation of the second permission. Based on authenticating the user and/or the user device 701 and receiving the user's permission, the microservices/PII service 702 decrypts the PII in step 712 and, in step 713, provides access to the decrypted PII to the third-party service 703. In step 714, the third-party service provides the request to perform the second process using the decrypted PII to the common third-party service 705. In step 715, the common third-party service 705 performs the second process. In step 716, the common third-party service 705 provides access to the results of the second process to one or more of the third-party device 704 and/or the third-party service 703. In step 717, the third-party service 703 provides the results of the second process to the microservices/PII service 702 and/or the user device 701. If the results of the second process were not previously received directly from the common third-party service in step 716, the third-party service 703 may forward the results to the third-party device 704.

Figure 8:
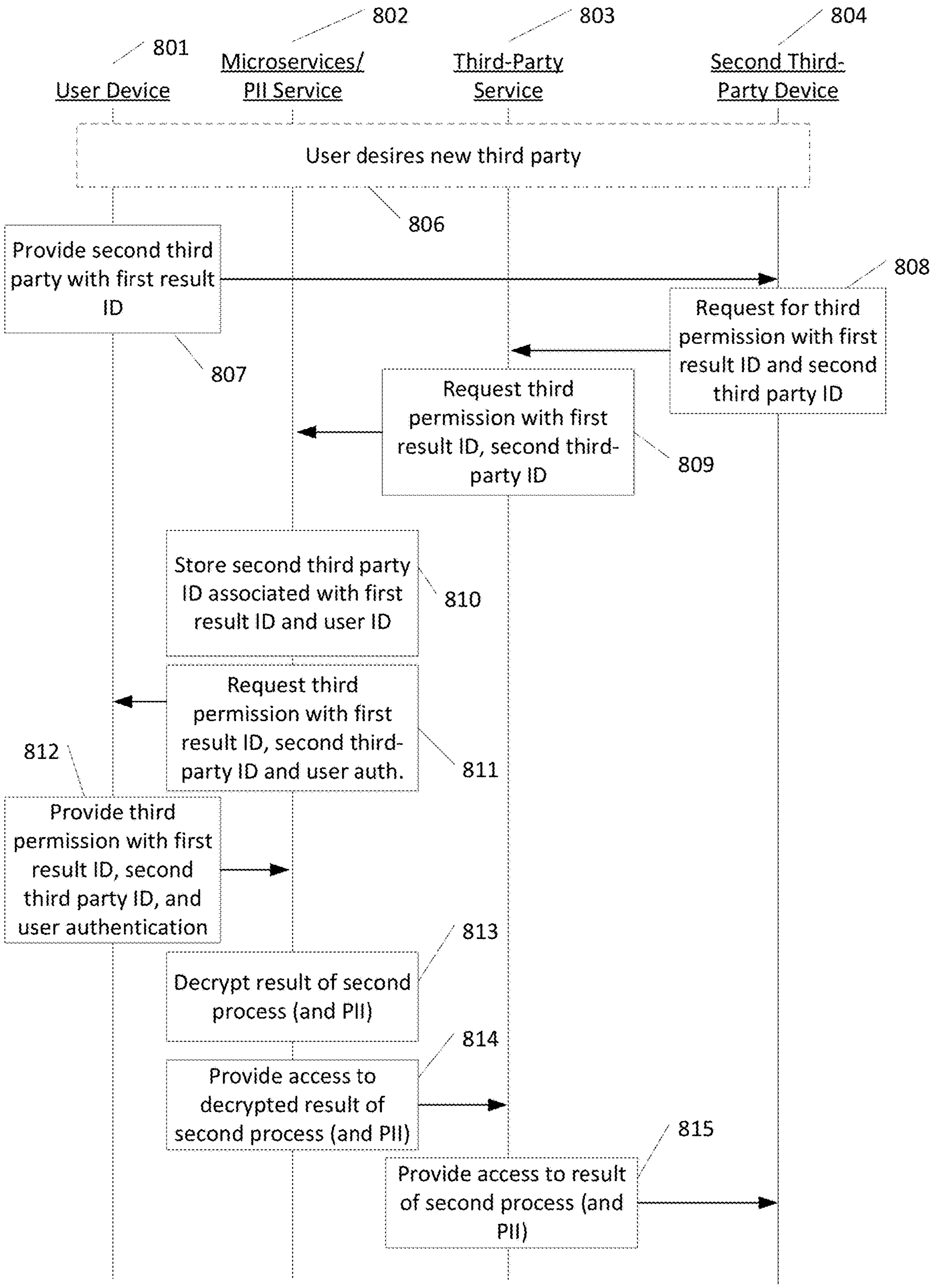

FIG. 8 shows a process by which a new second third-party device is able to obtain the results of the execution of the second process performed in either of step 615 of FIG. 6 or step 715 of FIG. 7. In FIG. 8, the second process has already been performed (e.g. in either of the processes of FIG. 6 or FIG. 7) and the results are being provided to a new third-party device. In FIG. 8, a user device 801, a microservices/PII service 802, a third-party service 803, and a second third-party device 804 are shown. As shown in dashed box 806, the user desires to work with a new third party. In step 807, the user, via user device 801, provides the second third-party device 804 with the first result ID. In step 808, the second third-party device 804 requests a third permission to authorize the second third-party device 804 to obtain the results of the second process. The request from step 808 may also comprise the first result ID (provided by the user device 801) and a second third-party ID that identifies the second third-party device 804. In step 809, the third-party service 803 generates a request for a third permission and includes the first result ID and the second third-party ID. In step 810, the microservices/PII service 802 stores the second third-party ID associated with the first result ID in the user ID. In step 811, the microservices/PII service 802 requests a third permission from the user device and includes the first result ID, the second third-party ID, and user authentication information, e.g. to pre-populate authentication fields required to authenticate the user device to the microservices/PII service 802. Having the identification of the second third party may be helpful to inform the user that the purpose of granting permissions is for a particular process and not for performing all future processes based on the PII.

In step 812, the user device 801 provides a communication that comprises the third permission with the first result ID, the second third-party ID, and the user authentication to the microservices/PII service 802. For example, the communication may include a multi-factor authentication to authenticate the user to the microservices/PII service 802.

For example, the user may receive, in step 811, an electronic communication (e.g., text message, email, push notification, etc.) requesting authorization by clicking a link (e.g., button) in the electronic communication. As noted throughout the disclosure, the electronic communication may comprise at least one of a user identifier, a result identifier, or a third-party identifier. Clicking the button may constitute permission and/or authorize the second third-party device 804 to obtain access to the result of the second process and the user's PII. Additionally or alternatively, the link may cause an application on the user device 801 to launch. Upon launching, the application may prompt the user to enter their credentials. The credentials may be standard login information, such as username and password, biometric authentication, one-time code, current location information (e.g., using a GPS signal), etc. Successfully logging into the application on the user device 801 may be considered third permission. Alternatively, the application may present an interface to the user that requests confirmation of the third permission. In step 813, the microservices/PII service 802 decrypts the result of the second process and, in step 814 provides access to the decrypted result of the second process to the third-party service 803. In step 815, the third-party service 803 provides access to the second result to the second third-party device 804.

Figure 9:
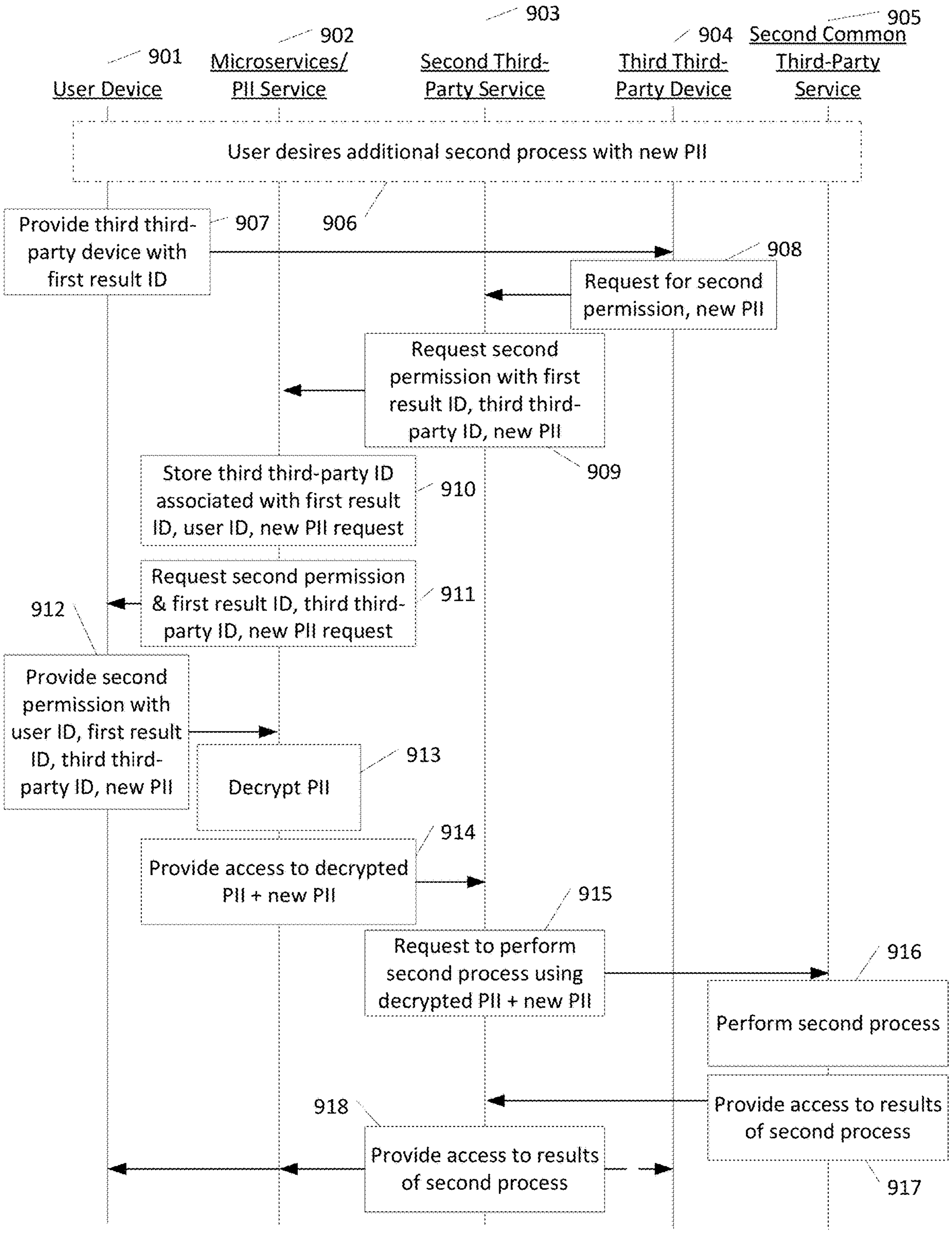

FIG. 9 shows a process where a user desires an additional execution of the second process based on additional PII, using for instance another third-party service. FIG. 9 includes a user device 901, a microservices/PII service 902, a second third-party service 903, a third third-party device 904, and a second common third-party service 905. As shown in step 906, a user desires the second process to be run again using new PII, for example, using new third-parties and services. In step 907, the user device 901 provides the third third-party device 904 with the first result ID. In step 908, the third third-party device 904 requests permission for the second process to be executed with new PII. The request from step 908 may also include the first result ID and a third third-party ID relating to the third third-party device 904. The request in step 908 may also include a request for the new PII. In step 909, the second third-party service 903 sends the request for the second permission with the first result ID, the third third-party ID, and an identification that a new PII is requested. In step 910, the microservices/PII service 902 stores the third third-party ID associated with the first result ID and the user ID. Step 910 may also store an indication that the new PII has been requested. In step 911, the request for the second permission is sent to the user device 901 with the first result ID, the third third-party ID, and a request for the new PII. Having the identification of the third third-party may be helpful to inform the user that the purpose of granting permissions is for a particular process and not for performing all future processes based on the PII.

In step 912, the user device 901 provides, to the microservices/PII service 902, a communication comprising the second permission with the user ID, the first result ID, the third third-party ID, and the new PII. For example, the user may receive, in step 911, an electronic communication (e.g., text message, email, push notification, etc.) requesting authorization by clicking a link (e.g., button) in the electronic communication. As noted throughout the disclosure, the electronic communication may comprise at least one of a user identifier, a result identifier, or a third-party identifier. Clicking the button may constitute permission and/or authorize the second process to be performed using the user's PII. Additionally or alternatively, the link may cause an application on the user device 701 to launch. Upon launching, the application may prompt the user to enter their credentials. The credentials may be standard login information, such as username and password, biometric authentication, one-time code, current location information (e.g., using a GPS signal), etc. Successfully logging into the application on the user device 701 may be considered second permission.

Alternatively, the application may present an interface to the user that requests confirmation of the second permission. In step 913, the microservices/PII service 902, after authenticating the user and the user device 901, decrypts the stored PII. In step 914 access is provided to the decrypted PII in the new PII. In step 915, the second third-party service 903 sends a request to perform the second process using the decrypted PII and the new PII to the second common third-party service 905. In step 916, the second common third-party service 905 performs the second process using the decrypted PII and the new PII. In step 917, the second common third-party service 905 provides access to the results of the second execution of the second process. In step 918, the second third-party service 903 provides access to the results of the second execution of second process using the decrypted PII and the new PII. The results may be accessed by the microservices/PII service 902, the user device 901 (e.g., via the microservices/PII service 902), and/or the third third-party device 904.

Processes for Handling Original and New User Information

Figure 10:
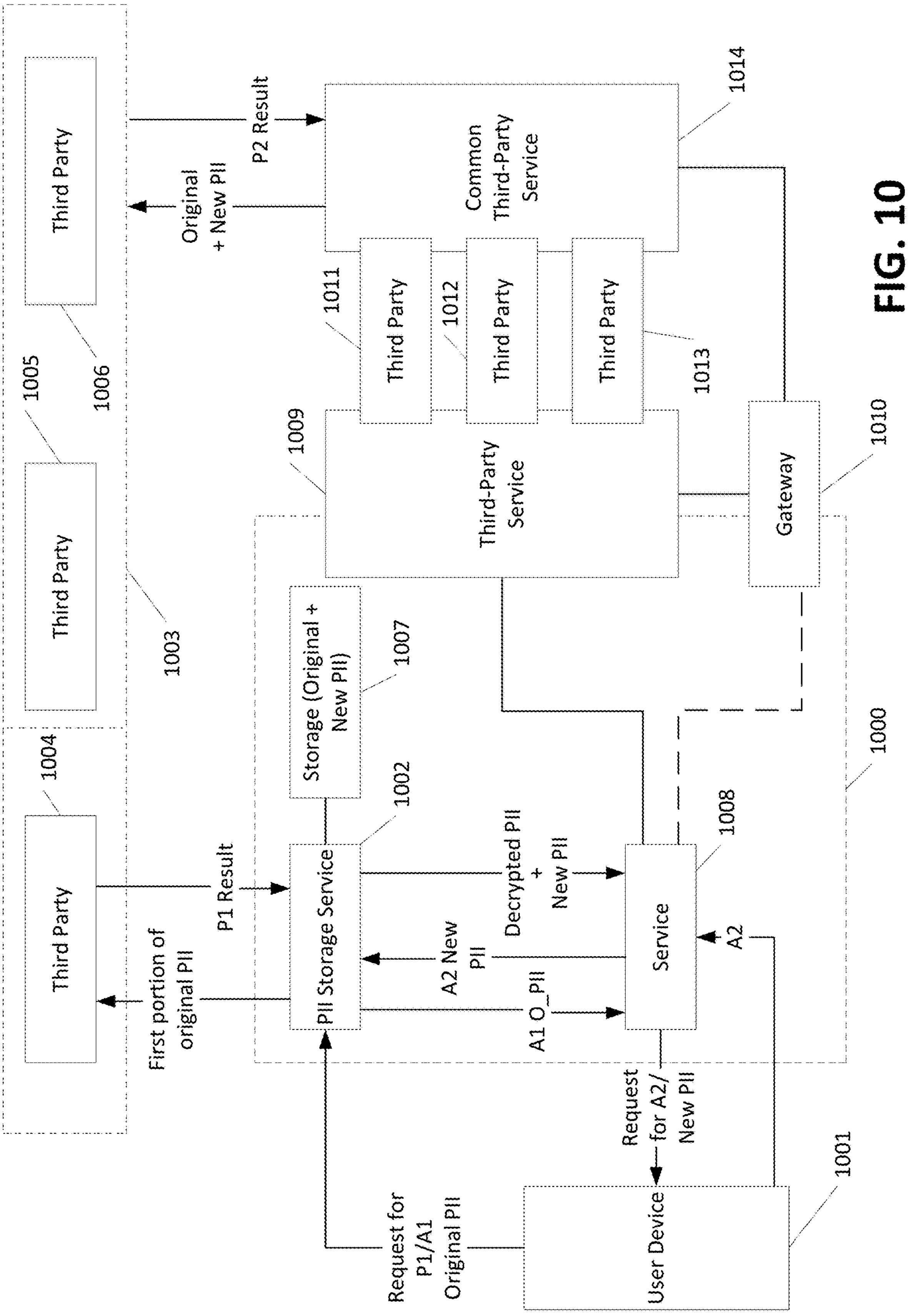
FIG. 10 depicts a block diagram of services and the interactions of those services handing existing user information and new user information.

FIG. 10 depicts a block diagram of services and the interactions of those services handing existing user information and new user information. FIG. 10 shows an example of the microservices of FIG. 9. FIG. 10 includes a microservices/PII service 1000, a user device 1001, a collection of third parties 1003 comprising third party 1004, third party 1005, and third party 1006. FIG. 10 includes third parties 1011-1013 interfacing with the microservices/PII service 1000 via the third-party service 1009 and a common third-party service 1014.

The user device 1001 sends a request for the performance of a first process along with a first authorization including permission for the performance of the first process and the user's original PII. The PII storage service 1002 of the microservices/PII service 1000 stores the original PII in storage 1007. A first portion of the PII is sent to the third party 1004. A result of the first process is received by the PII storage service 1002 and a result is stored in storage 1007. The authorization for the performance of the first process and optionally the result of the first process are sent to the service 1008. The service 1008 sends the first authorization and contact information for the user to one or more third parties 1011-1013, via the third-party service 1009. One or more of the third parties 1011-1013 make contact with the user or the user may contact one of the third parties 1011-1013. After the contact, one or more of the third parties 1011-1013 may request the user to provide permission for execution of a process using the user's PII but where the currently provided PII is incomplete. In the example of FIG. 10, additional PII is needed to perform the process (referred to in FIG. 10 as a third process). For instance, a second process using the user's PII may have already been performed and the user desired for the process to be performed again but using either a replacement PII and/or a new PII.

One of the third parties 1011-1013 sends a request to the user device 1001, via service 1008, requesting authorization to perform a third process, including the requisite permissions, using replacement/additional PII. The user authorizes, using a user interface of user device 1001, the performance of the process and provides the replacement/additional PII.

The user's authorization may comprise the requisite permissions to perform the process as well as any required authentications to the microservices/PII service 1000. The new authorization and replacement/additional PII are provided to PII storage service 1002 and encrypted and stored in storage 1007. Based on the authorization and authentications by the user, needed PII from storage 1007 may be decrypted and forwarded to the service 1008. In the event that the user has provided a replacement PII, the previously stored PII may not be forwarded from the PII storage service 1002 to the service 1008 as the service 1008 already has the replacement PII. In the event that the user has been provided additional PII, the previously stored PII may be forwarded as described above.

The replacement/new PII and authorizations are provided to the common third-party service 1014 and the PII for use in performance of the third process may be made available to one or more third parties 1003. If a new PII is to be included, then both the original PII in the new PII may be made available to the one or more third parties 1003. If replacement PII is to be included in the execution of the new process, then only the new PII may be forwarded to the one or more third parties 1003. The result of the third process may be received by the common third-party service 1014 and the results made available to the relevant third party 1011-1013, to the service 1008, to the PII storage service 1002 (and stored in the storage 1007), and possibly to the user device 1001.

Alternatively or additionally, the microservices/PII service 1000 may act on the results of the third process from the common third-party service 1014 and execute a new process on the PII stored in the storage 1007. This additional process may be performed to provide competing results and/or verification of the received results to ensure that the results from third parties 1003 comport with governmental regulations and/or other constraints and guidelines from other institutions. For instance, if the third result was a background check and the background check provided a first set of items to investigate, the separate execution of the process using the replacement/new PII by the microservices/PII service 1000 may act as a confirmation that the first set of items to investigate are indeed correct and/or other relevant items were not missed.

As described herein, the service 1008 and the third-party service 1009 are shown as separate services. Alternatively or additionally, they may be combined into a single service.

Data Structures

FIG. 11 depicts a sample dataset comprising encrypted PII as well as events and merchants that are related to the encrypted PII. FIG. 11 shows a data structure 1101 comprising fields relating individual users to their PII, authentication information for the users, results of various events, identifications of third parties interacting with the user based on those individual results, and/or the results of the various processes. It is appreciated that multiple tables and/or datasets may be used to associate information relating to users. FIG. 11 provides an example of a single table with user information and other associated information. However, multiple tables may be used in lieu of the single table of FIG. 11 (e.g., a user's PII may be stored separately from result IDs and third-party IDs). Other variations are possible and within the scope of the relationships of FIG. 11.

In FIG. 11, a number of users are identified in field 1102 including users A-C. Encrypted PII for each user may be stored in field 1103. User authentication credentials may be stored in field 1104. Result IDs (from performance of a process 1 and/or a process 2) may be stored in field 1105. Third-party IDs may be stored in field 1106, process 1 results stored in field 1107, and process 2 results stored in field 1108. It is appreciated that various tables may be combined or separated as needed to associate one or more of the fields identified in FIG. 11. For instance, as shown in FIG. 11, a single user A has a single result Q and a single process 1 result M. However, two different third-party IDs R, S are identified in field 1106 for user A. In one or more examples, the data structure of FIG. 11 may be provided as a first data structure having user IDs from field 1102 and result IDs from field 1105 and then having another table that associates result IDs with third-party IDs of field 1106, process 1 results of field 1107, and process 2 results of field 1108. In the example of FIG. 11, the user A interacted with two different third parties R, S based on the common result ID Q. While the process 1 result M is the same for each of the user's interactions with the third parties R, S, the process 2 results are different (e.g., N related to interactions with third party R and N+P related to interactions with third-party S). Optionally, a state of permissions requested from the user may be stored in an additional field.

FIG. 12 depicts a sample task object exchanged and updated during interactions across the platforms. FIG. 12 shows an example of a task object 1200 that may be exchanged between one or more entities as part of a microservice API as described herein. It is appreciated that other objects may be used in addition to or in place of the data structure object of FIG. 12. FIG. 12 is intended to provide an example of one or more sets of data that may be exchanged using the API and is not limited to a specific data structure.

FIG. 12 comprises a "task" as an object and includes one or more attributes of the identified "task". For example, the "task" may include a "taskType" identifier as a string that indicates a type of task for a third party to perform. The string may be a user-defined field or may have predefined valid values including, for instance, "check_availability", "schedule_view", "contact_user", "request_consent", "prefill_second_process_request", and the like. The "task" object may also reference an external object "external_reference" referring to, for example, the first result ID of FIG. 11 and as described herein. The "external_reference" object may include one or more subfields comprising, for instance, a reference ID field (e.g., providing the result ID) as well as a field that describes the type of reference. For example, the reference type may be identified as a specific reference type (shown in FIG. 12 as "StructureID") to identify that the reference ID correlates with a structured communication 304 as shown in FIG. 3. If the reference type field is blank or has another value, then the reference ID referred to something other than the structured communication 304. The task object 1200 may further include a task status string (e.g., "TaskStatus") that provides a status of the task object as being exchanged across the microservice APIs. Example statuses may comprise an "open" status (e.g., indicating the task is open for a third party to begin interacting with the task object 1200), an "in progress" status (e.g., indicating the task is in the process of being addressed by a third party), a "completed" status (e.g., indicating the task has been completed), a "canceled" status (e.g., indicating the task has been canceled and no further work and/or follow-up is desired), a "postponed" status (e.g., indicating the task is in a holding state and, until the task is taken out of that state, new work associated with the task is not to be performed), and/or a "not requested" status (e.g., indicating pre-population in anticipation of performing the second process is not desired; a third party may need to manually obtain and enter information for the user). Other statuses may be included and the above statuses removed as desired.

Graphical Interfaces

Figure 13:
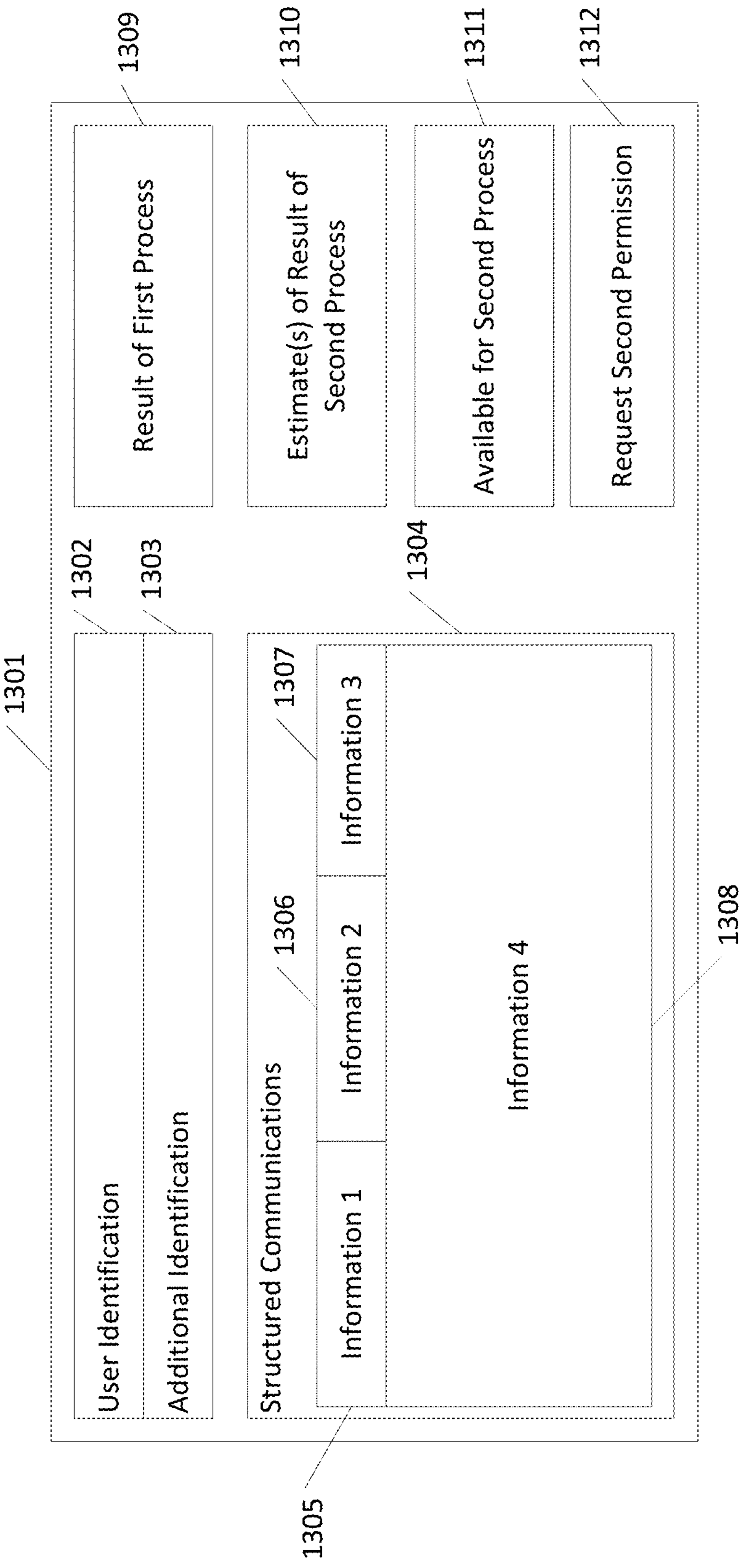
FIG. 13-16 depict various graphical interfaces for requesting and submitting user information for new processes.

FIGS. 13-16 depict various graphical interfaces for requesting and submitting user information for processes. In FIG. 13, a graphical interface 1301 is provided for a third party based on information contained in a task object 1200 of FIG. 12, in one or more related objects, and/or through other information sources including but not limited to direct queries and/or contacts from a user. In the example of FIG. 13, a user has already provided its PII and permissions for a first process to be performed. The first process has already been performed and the results of the first process have already been stored in the system.

The graphical interface 1301 may comprise a user identification field 1302 and an additional identification field 1303. The additional identification field may comprise other ways of identifying the user and/or identifying why the user is interested in interacting with the third-party. For example, if a user is interested in purchasing a car, information relating to the car may be provided in the additional identification field 1303. The graphical interface 1301 of FIG. 13 may further comprise a structured communication interface 1304 that may include one or more items of relevance to the proposed interaction between the user and the third party. For example, information 1 field 1305 may comprise information relating to a cost of a desired product, information 2 field 1306 may comprise adjustments to the cost of the desired product, information 3 field 1307 may comprise other service fees relating to the cost of the desired product, and information 4 field 1308 may comprise information pertaining to prepayment and/or additional offsets provided by the user. For instance, if a user was trading in a used car as part of a purchase of a new car, the trade-in value of the used car may be provided in information 4 field 1308. Additionally or alternatively, if a user is visiting a medical facility and needs to reenter the user's medical history, the information 4 field 1308 may comprise information relating to the one or more procedures to be performed on the user and/or information needed to be supplied by the user for the performance of the medical procedures.

The graphical interface 1301 may further comprise a results field 1309 that provides the results of the execution of the first process. The graphical interface 1301 may further comprise an estimate field 1310 that may provide one or more estimates of possible results from the execution of the second process. The graphical interface 1301 may further comprise a status field 1311 that may indicate whether the user is available for the second process to be executed and/or whether the system is capable of providing information for that particular user for the execution of the second process. The graphical interface 1301 may further comprise a request field 1312 (e.g. a button or other initiation-type user interface feature) configured to capture the third party's request to obtain a second permission from a user for pre-population of fields required for execution of the second process.

Figure 14:
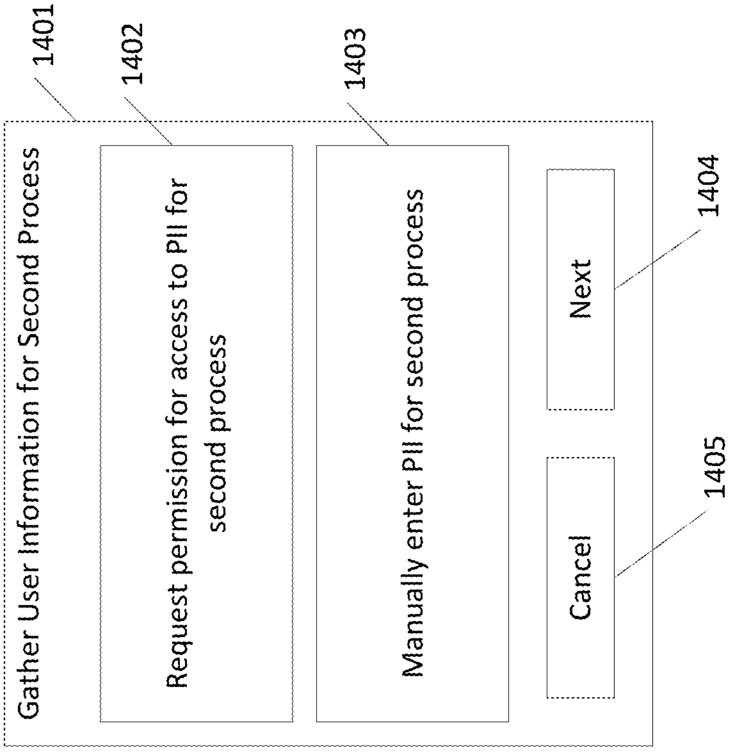

FIG. 14 shows another graphical interface 1401 for the third party that permits the third party to select by which process the third party will be able to obtain the user's PII in preparation for the performance of the second process. Graphical interface 1401 may comprise a first field 1402 that accepts the third party's selection of requesting permission from the user for the PII for the performance of the second process. Graphical interface 1401 may further comprise a second field 1403 where the third party indicates that it will be manually entering the PII for the second process. After a selection of one of fields 1402 or 1403, the third party may indicate the third party's intent to proceed (e.g., by clicking a "next" button 1404) or canceling the process to obtain the PII (e.g., via clicking a "cancel" button 1405).

Figure 15:
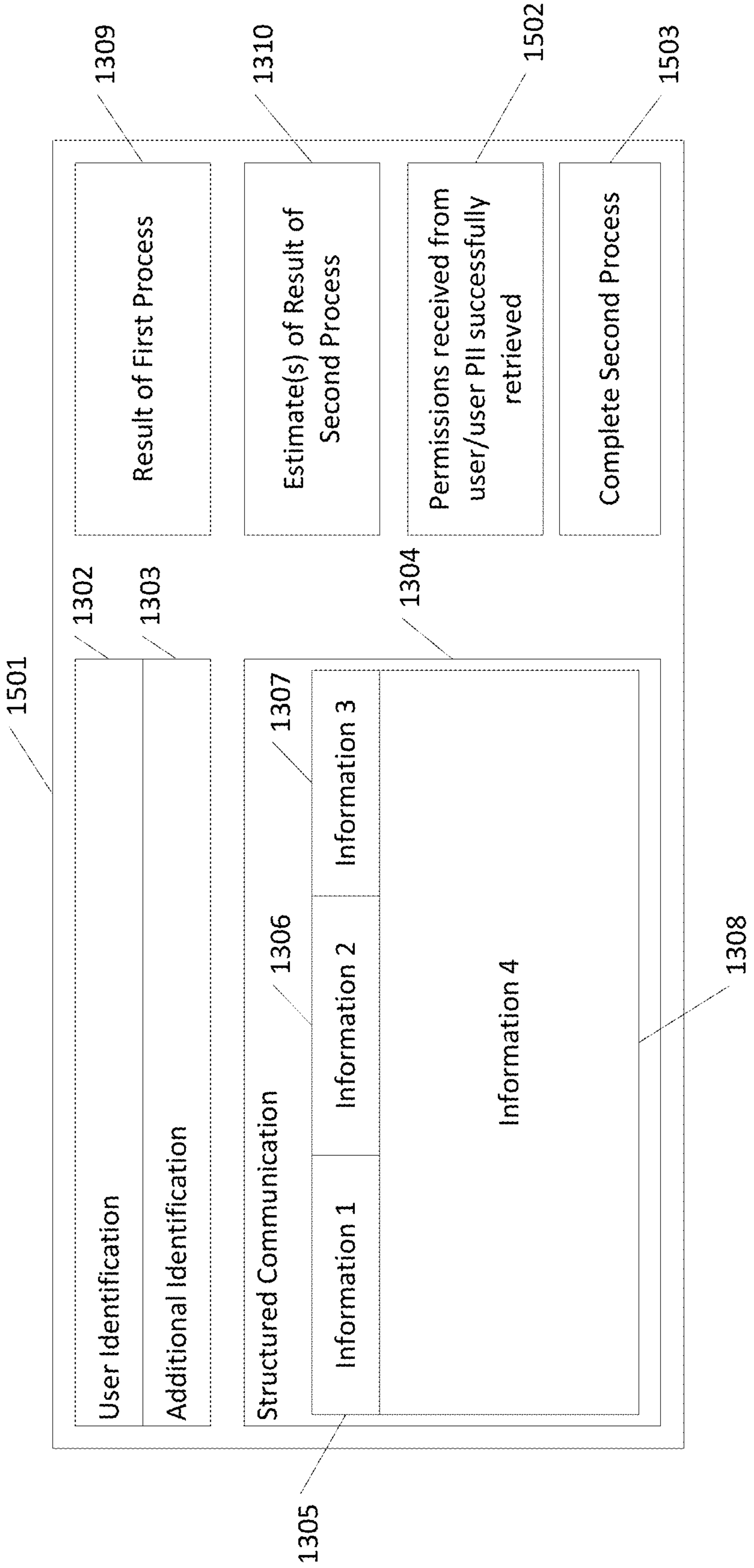
Figure 16:
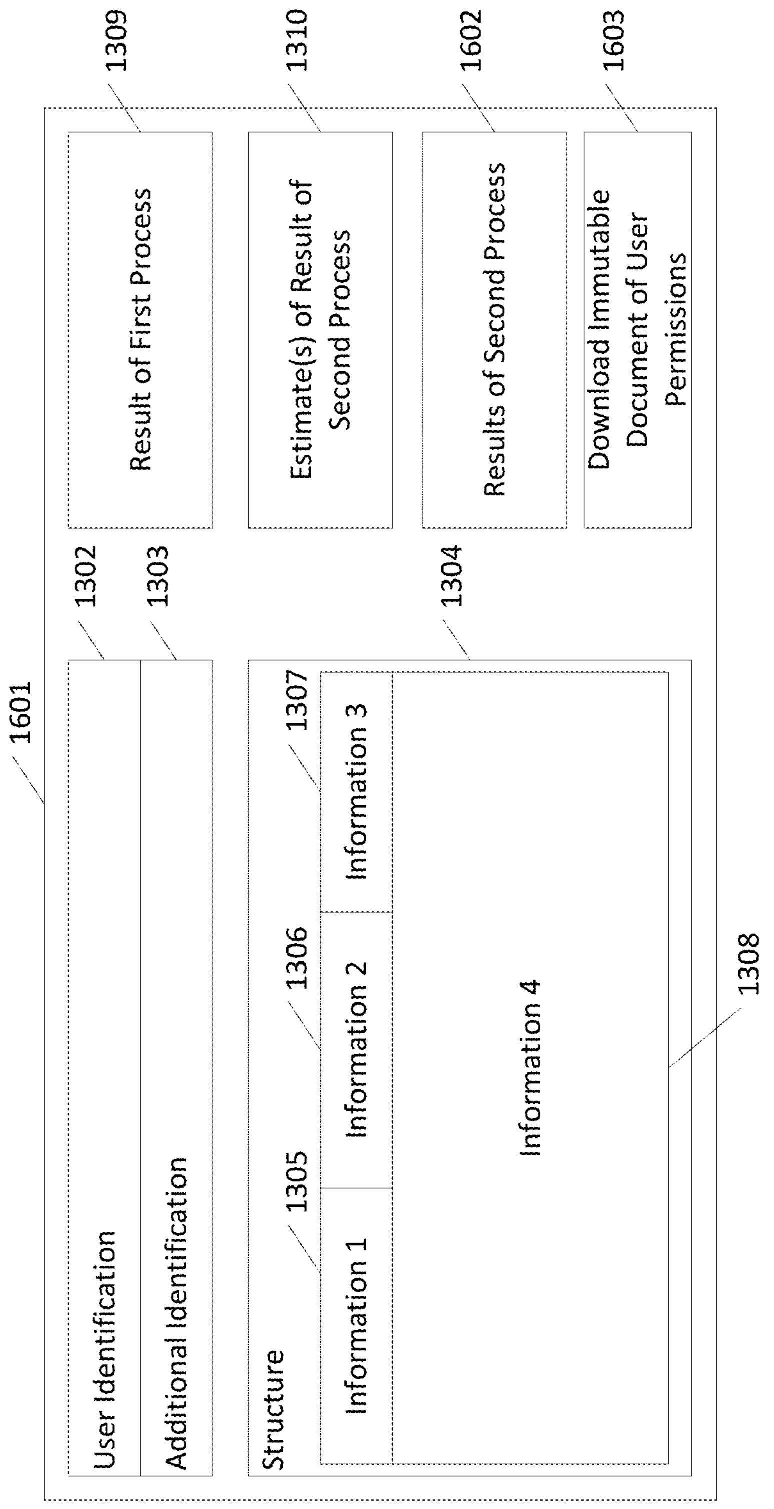

FIG. 15 comprises another graphical interface 1501 similar to the graphical interface of FIG. 13, with similar reference numbers used. Graphical interface field 1502 may provide information to the third party that permissions have been received from the user to be able to access the PII and/or that the user's PII has successfully been retrieved. Once the PII has been retrieved, the second process is ready to be performed. The third party may initiate the performance of the second process by clicking the graphical interface field 1503 (e.g., a button indicating the second process is to be performed). FIG. 16 comprises another graphical interface 1601 similar to the graphical interface of FIG. 13, with similar reference numbers used. Graphical interface field 1602 may provide the result of the execution of the second process. Graphical interface field 1603 may permit the third party to download an immutable copy of a document containing the text of the user's permissions for providing the user's PII for execution of the second process. Having the immutable copy of the permissions may be useful in the event the user questions why the third party initiated the performance of the second process. In one or more examples, the immutable copy may be a text file, an image file, and/or a portable document format (PDF) file or another file format.

User Authorizations

Figure 17:
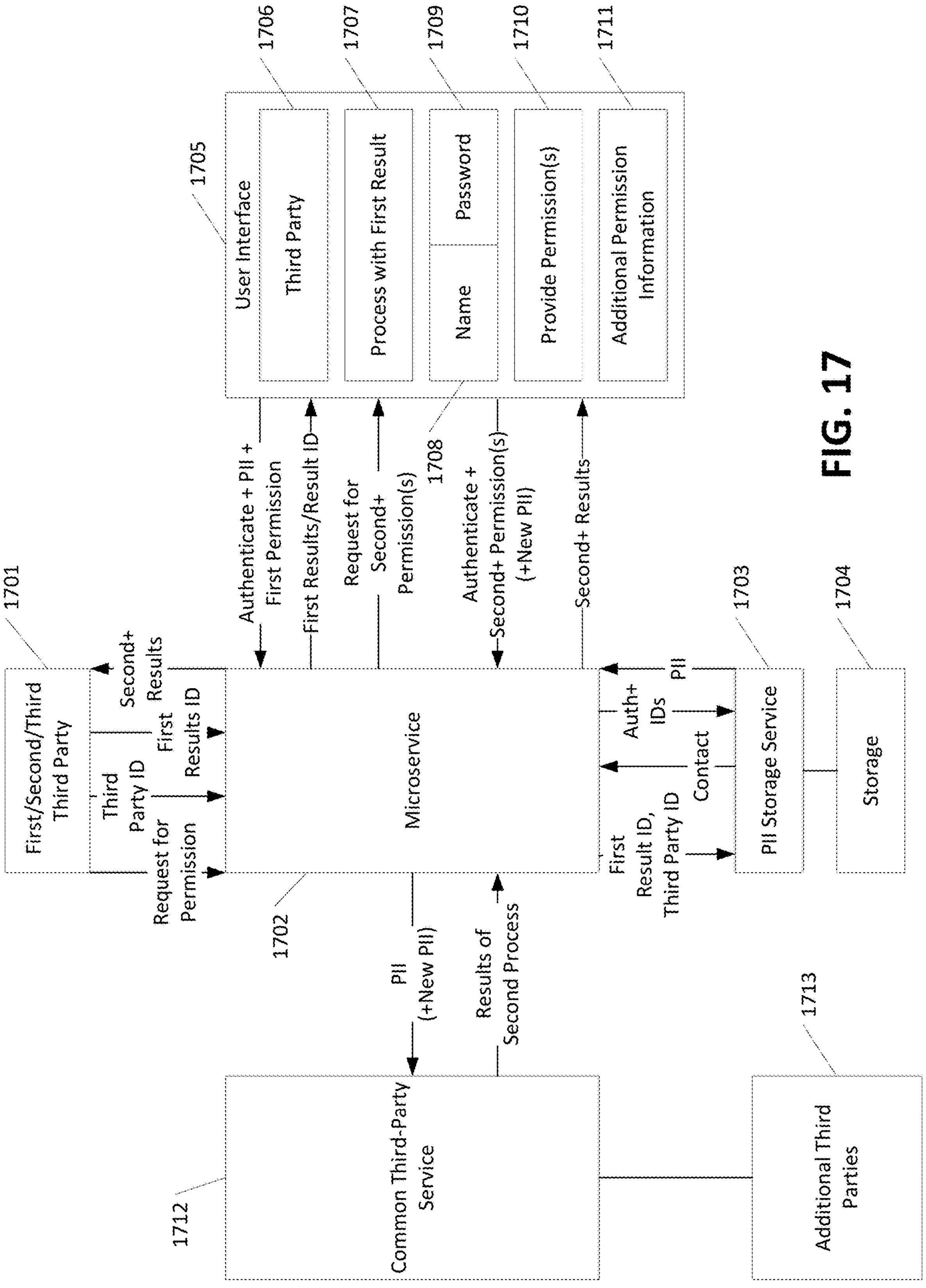
FIGS. 17-18 depict block diagrams showing interactions between a user and a microservice for providing authorizations for the use of the user's information.
Figure 18:
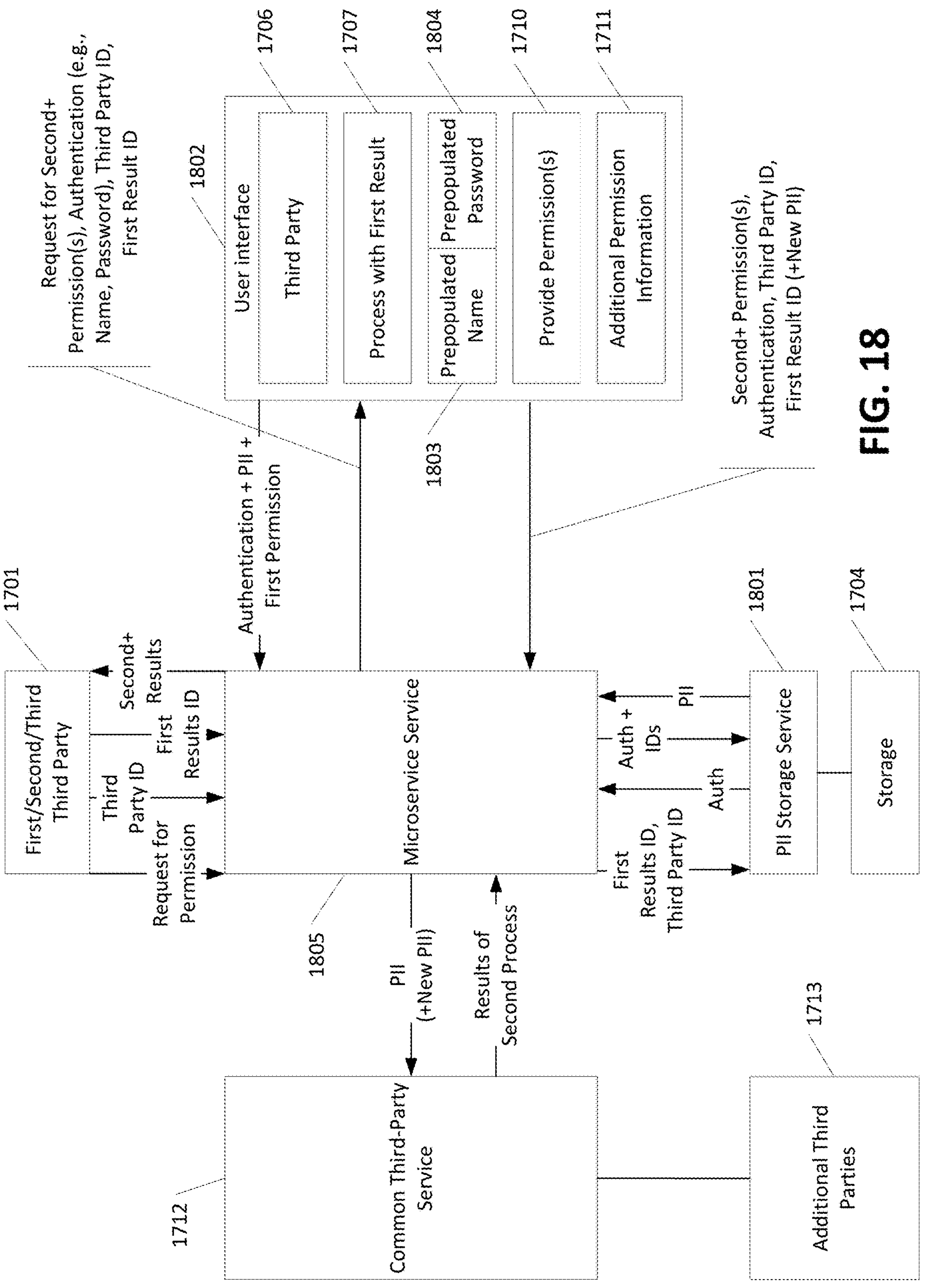

FIGS. 17-18 depict block diagrams showing interactions between users and a microservice for providing authorizations for the use of the user's PII. Microservices are an architectural and organizational approach to software development where software is composed of small independent services that communicate over well-defined APIs. The microservice of FIGS. 17-18 may be configured to handle small client-server transactions through various APIs. FIG. 17 includes third parties 1701, a service 1702, a PII storage service 1703, storage 1704, a user device with a graphical interface 1705, a common third party service 1712, and additional third parties 1713. Third parties (e.g., that request permissions for a user's PII to be used in second and other processes) are shown generally as third party 1701. As described herein, the third party 1701 may be the first, second, or further third party.

A user, using the user device with the graphical interface 1705, authenticates (e.g., entering the user's name and password into regions 1708 and 1709, respectively) to the PII storage service 1703, enters the user's PII, and provides its permission for performance of a first process (not shown). The results of the performance of the first service are provided to the user along with a results ID related to the result of the performance of the first service. The PII storage service 1703 stores the results ID in storage 1704 in association with the user's ID (e.g., the results ID stored in field 1105 in association with the user ID of field 1102 of FIG. 11).

As part of the permissions to perform the first process and generate the first results, the user may consent to contacts from one or more third parties relating to the first results. For example, the first process may be the performance of the first medical tests or services for the user. Part of the permissions to perform the medical services may comprise consenting to the distribution of test results (e.g., results of a radiological examination) to other medical professionals. To permit the user's PII to be provided to medical professionals not affiliated with the medical providers of the first medical services, another medical professional (e.g., a second radiologist who is providing a second opinion on a first set of conclusions of a first radiologist based on the user's first radiological examination) requests the microservice 1702 to obtain new permissions from the user for the user's PII to be provided to another medical service provider (e.g., another facility that performs radiological examinations). The user may be examined at the second facility and the results provided to the second radiologist. In another example, the first process may be an attempt to prequalify for a loan in anticipation of shopping for a new car. Part of the loan prequalification process may comprise consenting to contacts from car dealerships with offers for vehicles matching the prequalified user's interests. After obtaining the second permissions from the user, the car dealership may initiate the performance of second or further processes that may include obtaining financing offers from one or more financial institutions. Instead of filling out loan forms for the one or more loan offers, the user's PII relating to the loan prequalification (the first process) may be obtained from the storage 1704 and distributed to the financial institutions, such as DealerTrack and RouteOne. The financial institutions may then generate (the second process) loan offers and forward them to the user and/or the car dealership that initiated the request for the second permissions.

Based on permissions provided to review the first results or by being provided the results ID, the third party 1701 sends the request for the second set of permissions to the microservice 1702. The second set of permissions may be for the performance of a second or further process to be performed for the user by reusing the user's previously entered PII. The third party 1701 also sends, to the microservice 1702, its third party ID and the first ID (relating to the result of the performance of the first process). The microservice 1702 forwards the first results ID and the third party ID to the PII storage service 1703. The PII storage service 1703 requests, from the storage 1704, contact information for the user associated with the first results ID and instructs the storage 1704 to store the third party ID in association with the first results ID. As the first results ID is associated with a particular user, the second permissions to be provided by the user may be limited to the particular first results ID (thus, limiting the distribution of the user's PII to other entities that do not have access to the first results ID).

The storage 1704 provides the user's contact information to the microservice 1702. The contact information may comprise an email address, an app ID for an application executing on the user's mobile device, and/or other specific information to contact the user to obtain the second permissions.

The microservice 1702 may send a request for the second permissions to the user using the user's contact information and also provide information specific to the user that identifies the third party and the results of the first process. The third party may be shown in region 1706 of graphical interface 1705 and the results of the first process provided in region 1707. The user may authenticate itself by entering their username in region 1708 and password in region 1709 and providing the one or more second permissions by selecting graphical interface region 1710 (e.g., a button and/or other selectable option) to authorize the user's PII to be made available from the storage 1704 to additional third parties 1713. Graphical interface 1705 may also include another region 1711 to capture any further PII needed for the performance of the second or further processes. The user authentication and permissions may be provided in a single interaction with the microservice 1702 or may be provided in two or more interactions (e.g., authenticating a user before accepting any permissions from the user).

The user's authentication information, second (or further) permissions, and possibly new PII is provided to the microservice 1702. The user authentication information, second permission, and additional IDs (e.g., the result ID and/or the third party ID) are provided to the PII storage service 1703. The PII storage service 1703 determines whether the user authentication information is accurate and, if correct, accepts the user's grant of the second or further permissions regarding the user of the user's previously entered PII and possibly the newly entered PII. The PII storage service 1703 obtains the previously entered PII from the storage 1704 and forwards it (and any new PII) to the common third-party service 1712. The common third-party service 1712 interacts with one or more additional third parties 1713 to perform the second process and obtain the results of the second process. The results of the second process may be provided to the microservice 1702 which may then provide the results of the second process to the user via graphical interface 1705 and/or the third party 1701 (and further possibly to PII storage service 1703 for storage in storage 1704 associated with the first results ID and the third party ID of the third party 1701).

FIG. 18 shows an alternate example of interactions between the microservice, the PII storage service, and the graphical interface of FIG. 17. Common elements between FIG. 17 and FIG. 18 retain their common reference numerals. The third party 1701 provides the request for the permission, the third party ID, and the first results ID to the microservice 1702. The microservice 1805 provides the first results ID and the third party ID to the PII storage service 1801. The PII storage service 1801 sends user authentication information to the microservice 1805. The microservice 1805 forwards the user authentication information along with the other information described in FIG. 17 to the graphical interface 1802 in a secure manner (e.g., via encryption, a secure tunnel, non-extensible properties associated with a communication to the user device, etc.). The graphical interface 1802 includes prepopulated name field 1803 and prepopulated password field 1804 as prepopulated with the authentication information from the PII storage service 1801. The user grants the new permissions via graphical interface 1802 and the remainder of the second process proceeds as described in FIG. 17. Additionally or alternatively, the prepopulated name field 1803 and the prepopulated password field 1804 may comprise an encoded link with the user's name and password included as part of the link. Upon decryption of the encoded link, the user's authentication credentials may be obtained and associated with the user's granted permission as described above.

Permission-Handling/Prefill Server-Based Processes

Figure 19:
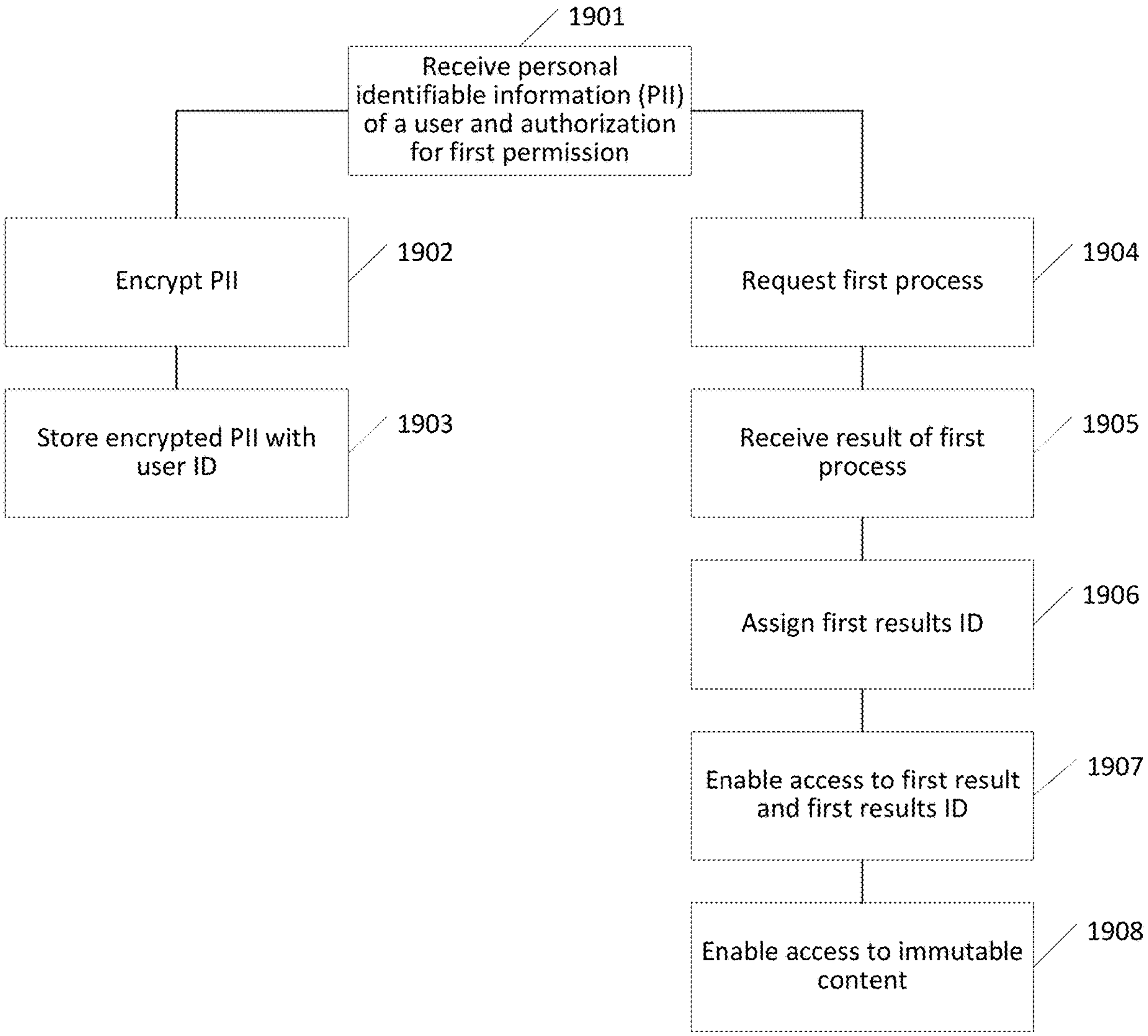
FIGS. 19-21 depict flowcharts showing various processes for obtaining user authorizations for exchanging the user's PII across platforms.
Figure 20:
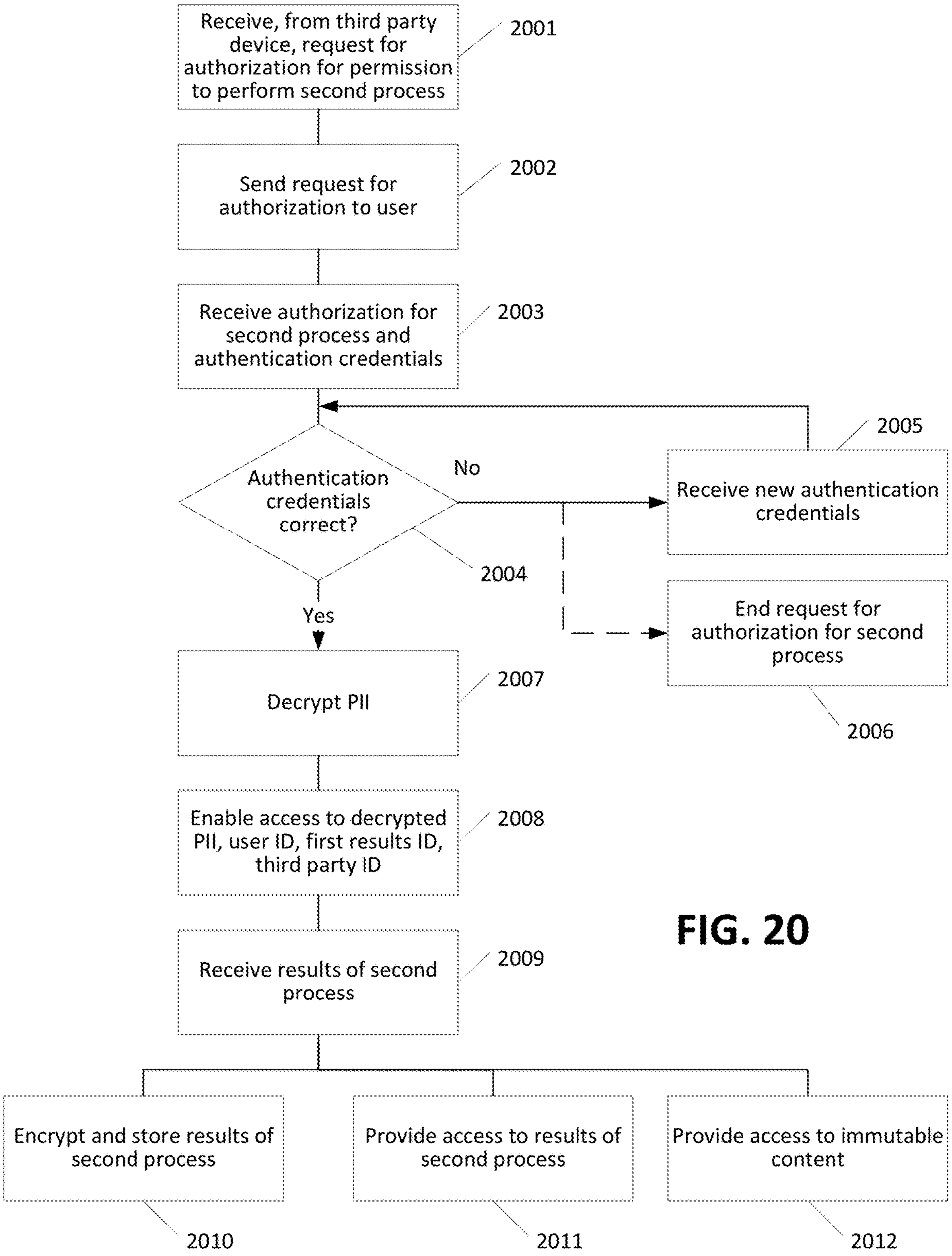
Figure 21:
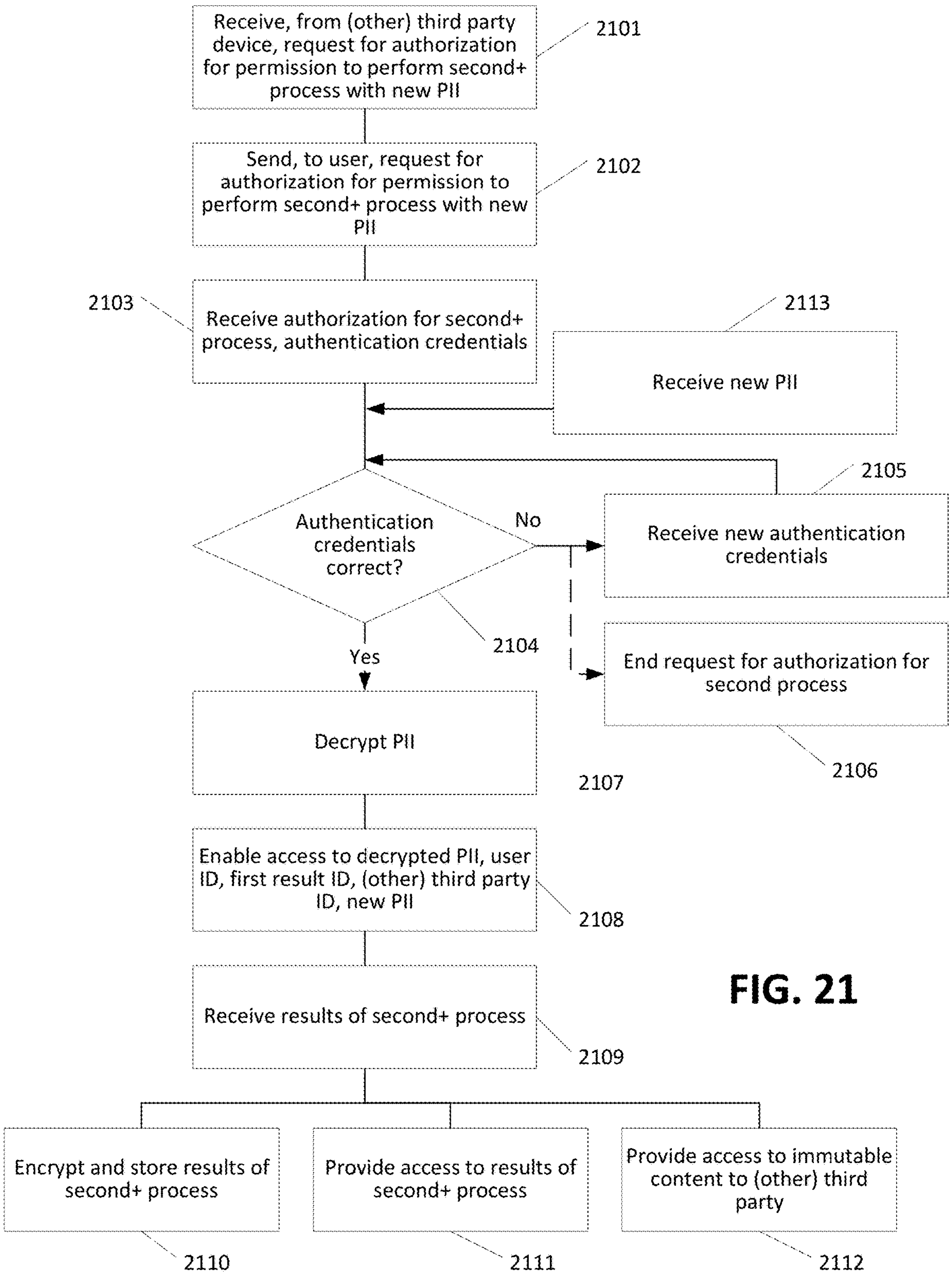

FIGS. 19-21 depict flowcharts showing various processes for obtaining user authorizations for new processes. FIG. 19 shows a process for obtaining a user's PII and permissions for the performance of a first process. In step 1901, a microservice receives a user's PII and authorization providing a first permission. In step 1902, the PII is encrypted and, in step 1903, the encrypted PII is stored in association with a user ID associated with the user. A first process, based on the first permissions, may be also performed before, during, and/or after the encryption and storage of the PII in steps 1902 and 1903). In step 1904, the first process is requested based on the user's permission and PII from step 1901. In step 1905, the results of the first process are received. In step 1906, a results ID is assigned (if not already assigned during the performance of the process and/or assigned as part of the request for the first process in step 1904). In step 1907, access to the first result and first results ID are provided to the user and/or one or more third parties. In step 1908, access to an immutable version of the user's granted permissions is provided to the user and/or the one or more third parties. The timing of step 1908, as are the timings of steps described herein, is shown for explanation. Step 1908 may occur before, during, or after other steps of FIG. 19.

FIG. 20 shows a process for obtaining second or further permissions from a user. In step 2001, a microservice receives, from a third-party device, a request for authorization for permission to perform a second process using the previously entered PII. In step 2002, a request for the authorization is sent to the user. In step 2003, authorization is received for the performance of the second process using the previously entered PII along with the user's authentication credentials. In step 2004, the user's authentication credentials are verified. If the user's authentication credentials are not correct, then in step 2005, the user is notified and new user credentials are received from the user and the credentials are checked again in step 2004. Additionally or alternatively, the process may end in step 2006 if too many attempts at submitting incorrect credentials occurred.

In step 2007, based on correct credentials, the PII is decrypted and, in step 2008, access is enabled to the decrypted PII, the user ID, the first results ID, and the third party ID. The second process is performed and the results are received in step 2009. In step 2010, the results of the second process may be encrypted and stored. In step 2011, access may be provided to the results of the second process. In step 2012, access may be provided to an immutable version of the user's second permissions.

FIG. 21 shows a process for requesting permissions for a second or further process and obtaining additional PII from the user. In step 2101, a microservice receives, from a third-party device, a request for authorization for permission to perform a second or further process using the previously entered PII and new PII. In step 2102, a request for authorization is sent to the user along with a request to enter the new PII. In step 2103, authorization is received for the performance of the second or further process using the previously entered PII along with the user's authentication credentials. The new PII may be received in step 2103 or may be received separately in step 2113. In step 2104, the user's authentication credentials are verified. If the user's authentication credentials are not correct, then in step 2105, the user is notified and new user credentials are received from the user and the credentials are checked again in step 2004. Additionally or alternatively, the process may end in step 2106 if too many attempts at submitting incorrect credentials occurred.

In step 2107, based on correct credentials, the original PII is decrypted and, in step 2108, access is enabled to the decrypted PII, the newly received PII, the user ID, the first results ID, and the third party ID. The second or further process is performed and the results are received in step 2109. In step 2110, the results of the second or further process may be encrypted and stored. In step 2111, access may be provided to the results of the second or further process. In step 2112, access may be provided to an immutable version of the user's second or further permissions.

Based on the above, a computer-implemented method may comprise receiving, by a computing device and from a user device, personal identifiable information (PII) of a user; receiving, by the computing device, a first authorization for a first permission; encrypting the PII responsive to the first authorization; and storing the encrypted PII associated with a first identifier. The first identifier may include a user identifier. The method may further include enabling, by the computing device and for one or more third-party computing systems, access to a result based on at least part of the PII and consistent with the first permission. The result may be associated with a second identifier. The method may further include receiving a request for a second permission of the user from a first third-party computing system of the one or more third-party computing systems. The first third-party computing system may be associated with a third identifier. The method may further include sending, to the user device, an encoded link as part of a request for a second authorization for the second permission. The encoded link may include the first identifier, the second identifier, and the third identifier. The method may further include receiving, from the user device and via access to the encoded link, a response to the request for the second authorization. The response may include the second authorization, the first identifier, the second identifier, and the third identifier. The method may further include accessing, by the computing device and based on receiving the second authorization, the encrypted PII; decrypting the encrypted PII; and enabling, by the computing device and for a second third-party computing system, access to at least part of the decrypted PII to initiate a process consistent with the second permission. In some aspects, the access may be via a secure channel.

In one or more aspects, the method may further include accessing the encrypted PII may be further based on the first identifier, the second identifier, and the third identifier. In other aspects, the method may further include accessing, by the computing device, a second result from the process and enabling access, by a third third-party computing system, to the second result. In some examples, the method may further include accessing, by the computing device, a second result from the process; encrypting the second result; and storing, associated with the first identifier and the second identifier, the encrypted second result.

In some aspects, the computer-implemented method may further include enabling access to the first identifier, the second identifier, and the third identifier. In some aspects, the method may further include receiving user authentication information and authenticating, by the computing device and based on the received user authentication information, the user device. In some aspects, the method may further include enabling, by the computing device and for the one or more third-party computing systems, access to an immutable document comprising the first authorization for the first permission. In some aspects, the method may further include enabling, by the computing device and for the first third-party computing system, access to an immutable document comprising the second authorization for the second permission.

An apparatus, in accordance with various aspects, may comprise one or more processors; and memory storing instructions that, when executed by the one or more processors, cause the apparatus to receive, from a user device, personal identifiable information (PII) of a user; receive a first authorization for a first permission; encrypt the PII responsive to the first authorization; and store, in a storage, the encrypted PII associated with a first identifier. In one or more examples, the first identifier may comprise a user identifier. The instructions may further cause the apparatus to enable, for one or more third-party computing systems, access to a result based on at least part of the PII and consistent with the first permission. The result may be associated with a second identifier. The instructions may further cause the apparatus to receive a request for a second permission of the user from a first third-party computing system of the one or more third-party computing systems. The first third-party computing system may be associated with a third identifier. The instructions may further cause the apparatus to send, to the user device, an encoded link as part of a request for a second authorization for the second permission, wherein the encoded link may comprise the first identifier, the second identifier, and the third identifier; receive, from the user device and via access to the encoded link, a response to the request for the second authorization. The response may comprise the second authorization, the first identifier, the second identifier, and the third identifier. The instructions may further cause the apparatus to access, based on receiving the second authorization, the encrypted PII; decrypt the encrypted PII; and enable, for a second third-party computing system, access via a secure channel to at least part of the decrypted PII to initiate a process consistent with the second permission.

In one or more further aspects, the instructions may cause the apparatus to receive interactions between the call center and the user; and retrain, based on the interactions between the call center and the user and based on the previous interactions of the previous users with their applications and with the call centers, the machine-learning model. The instructions to access the encrypted PII may be based on the first identifier, the second identifier, and the third identifier. In one or more further aspects, the instructions may further cause the apparatus to access a second result from the process; and enable access, by a third third-party computing system, to the second result.

Additionally or alternatively, in one or more further aspects, the instructions may further cause the apparatus to access a second result from the process; encrypt the second result; and store, in the storage and associated with the first identifier and the second identifier, the encrypted second result. The instructions may further cause the apparatus to enable access to the first identifier, the second identifier, and the third identifier.

In one or more further aspects, the instructions may cause the apparatus to authenticate, based on received user authentication information, the user device; enable, for the one or more third-party computing systems, access to an immutable document comprising the first authorization for the first permission; and/or enable, for the first third-party computing system, access to an immutable document comprising the second authorization for the second permission.

A non-transitory media storing instructions that, when executed by one or more processors, cause the one or more processors to perform steps comprising receiving, by a computing device and from a user device, personal identifiable information (PII) of a user; receiving, by the computing device, a first authorization for a first permission; encrypting the PII responsive to the first authorization; storing the encrypted PII associated with a first identifier (e.g., a user identifier); enabling, by the computing device and for one or more third-party computing systems, access to a result based on at least part of the PII and consistent with the first permission (e.g., where the result is associated with a second identifier); receiving a request for a second permission of the user from a first third-party computing system of the one or more third-party computing systems, wherein the first third-party computing system is associated with a third identifier; and sending, to the user device, an encoded link as part of a request for a second authorization for the second permission. In some examples, the encoded link may comprise the first identifier, the second identifier, and the third identifier. The instructions may further cause the one or more processors to perform steps comprising receiving, from the user device and via access to the encoded link, a response to the request for the second authorization. The response may comprise the second authorization, the first identifier, the second identifier, and the third identifier.

The instructions may further cause the one or more processors to perform steps comprising accessing, by the computing device and based on receiving the second authorization, the encrypted PII; decrypting the encrypted PII; and enabling, by the computing device and for a second third-party computing system, access to at least part of the decrypted PII to initiate a process consistent with the second permission, wherein the access is via a secure channel. In some aspects, the instructions for accessing the encrypted PII are further based on the first identifier, the second identifier, and the third identifier. The instructions may further cause the one or more processors to perform steps comprising accessing, by the computing device, a second result from the process; and enabling access, by a third third-party computing system, to the second result.

The instructions may further cause the one or more processors to perform steps comprising accessing, by the computing device, a second result from the process; encrypting the second result; and storing, associated with the first identifier and the second identifier, the encrypted second result.

Other embodiments of this aspect include corresponding computer systems, apparatus, and computer programs recorded on one or more computer storage devices, each configured to perform the actions of the methods.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:

receiving, by a computing device and from a user device, personal identifiable information (PII) of a user;

encrypting the PII;

storing the encrypted PII associated with a first identifier, wherein the first identifier comprises a user identifier;

storing a first result of processing the PII with a second identifier;

receiving, from a third-party computing system, a request for a permission of the user to access the PII, wherein the third-party computing system is associated with a third identifier;

sending, to the user device, an encoded link as part of a request for an authorization for the permission, wherein the encoded link comprises the first identifier, the second identifier, and the third identifier;

receiving, from the user device and via access to the encoded link, a response to the request for the authorization, wherein the response comprises the authorization, the first identifier, the second identifier, and the third identifier;

accessing, by the computing device and based on receiving the authorization, the encrypted PII;

decrypting the encrypted PII; and enabling, by the computing device and for the third-party computing system, access to at least part of the decrypted PII, wherein the access is via a secure channel.

2. The computer-implemented method of claim 1, wherein accessing the encrypted PII is further based on the first identifier, the second identifier, and the third identifier.

3. The computer-implemented method of claim 1, further comprising:

accessing, by the computing device, a second result from the processing of the PII; and enabling access, by a second third-party computing system, to the second result.

4. The computer-implemented method of claim 1, further comprising:

accessing, by the computing device, a second result from the processing of the PII;

encrypting the second result; and storing, associated with the first identifier and the second identifier, the encrypted second result.

5. The computer-implemented method of claim 1, wherein the enabling access to at least part of the decrypted PII further comprises:

enabling access to the first identifier, the second identifier, and the third identifier.

6. The computer-implemented method of claim 1, wherein receiving the response from the user device further comprises receiving user authentication information, the method further comprising:

authenticating, by the computing device and based on the user authentication information, the user device.

7. The computer-implemented method of claim 1, wherein the enabling access to the first result further comprises:

enabling, by the computing device and for the one or more third-party computing systems, access to an immutable document comprising a first authorization for a first permission.

8. The computer-implemented method of claim 1, further comprising:

enabling, by the computing device and for the third-party computing system, access to an immutable document comprising the authorization for the permission.

9. An apparatus comprising:

one or more processors; and memory storing instructions that, when executed by the one or more processors, cause the apparatus to:

receive, from a user device, personal identifiable information (PII) of a user;

encrypt the PII;

store the encrypted PII associated with a first identifier, wherein the first identifier comprises a user identifier;

store a first result of processing the PII with a second identifier;

receive, from a third-party computing system, a request for a permission of the user to access the PII, wherein the third-party computing system is associated with a third identifier;

send, to the user device, an encoded link as part of a request for an authorization for the permission, wherein the encoded link comprises the first identifier, the second identifier, and the third identifier;

receive, from the user device and via access to the encoded link, a response to the request for the authorization, wherein the response comprises the authorization, the first identifier, the second identifier, and the third identifier;

access, based on receiving the authorization, the encrypted PII;

decrypt the encrypted PII; and enable, for the third-party computing system, access to at least part of the decrypted PII and an immutable document, wherein the access is via a secure channel.

10. The apparatus of claim 9, wherein the instructions to access the encrypted PII are further based on the first identifier, the second identifier, and the third identifier.

11. The apparatus of claim 9, wherein the instructions further cause the apparatus to:

access a second result from the processing of the PII; and enable access, by a second third-party computing system, to the second result.

12. The apparatus of claim 9, wherein the instructions further cause the apparatus to:

access a second result from the processing of the PII;

encrypt the second result; and store, associated with the first identifier and the second identifier, the encrypted second result.

13. The apparatus of claim 9, wherein the instructions to enable access further cause the apparatus to enable access to the first identifier, the second identifier, and the third identifier.

14. The apparatus of claim 9, wherein the response from the user device further comprises user authentication information, and wherein the instructions further cause the apparatus to:

authenticate, based on the user authentication information, the user device.

15. The apparatus of claim 9, wherein the response to the request for the authorization further comprises at least one of:

a username and password;

a biometric identifier; or a one-time code.

16. The apparatus of claim 9, wherein the authorization comprises multi-factor authentication.

17. One or more non-transitory media storing instructions that, when executed by one or more processors, cause the one or more processors to perform steps comprising:

receiving, from a user device, personal identifiable information (PII) of a user;

encrypting the PII;

storing the encrypted PII associated with a first identifier, wherein the first identifier comprises a user identifier;

storing a first result of processing the PII with a second identifier;

receiving, from a third-party computing system, a request for a permission of the user to access the PII, wherein the third-party computing system is associated with a third identifier;

sending, to the user device, an encoded link as part of a request for an authorization for the permission, wherein the encoded link comprises the first identifier, the second identifier, and the third identifier;

receiving, from the user device and via access to the encoded link, a response to the request for the authorization, wherein the response comprises the authorization, the first identifier, the second identifier, and the third identifier;

accessing, based on receiving the authorization, the encrypted PII;

decrypting the encrypted PII;

enabling, for the third-party computing system, access to at least part of the decrypted PII;

accessing a second result from the processing of the PII; and enabling access, by a second third-party computing system, to the second result.

18. The one or more non-transitory media of claim 17, wherein the instructions for accessing the encrypted PII are further based on the first identifier, the second identifier, and the third identifier.

19. The one or more non-transitory media of claim 17, wherein the response to the request for the authorization further comprises at least one of:

a username and password;

a biometric identifier; or a one-time code.

20. The one or more non-transitory media of claim 17, wherein the authorization comprises multi-factor authentication.

* * * * *